United States Patent
Lee et al.

(10) Patent No.: US 9,832,058 B2
(45) Date of Patent: Nov. 28, 2017

(54) APPARATUS AND METHOD FOR SCRAMBLING CONTROL FIELD INFORMATION FOR WIRELESS COMMUNICATIONS

(71) Applicant: NEWRACOM, INC., Irvine, CA (US)

(72) Inventors: Dae Won Lee, Portland, OR (US); Yujin Noh, Irvine, CA (US); Young Hoon Kwon, Laguna Niguel, CA (US); Yongho Seok, Irvine, CA (US); Sungho Moon, San Jose, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/340,939

(22) Filed: Nov. 1, 2016

(65) Prior Publication Data

US 2017/0126456 A1 May 4, 2017

Related U.S. Application Data

(60) Provisional application No. 62/250,373, filed on Nov. 3, 2015, provisional application No. 62/294,248, filed on
(Continued)

(51) Int. Cl.
*H04L 27/26* (2006.01)
*H04L 1/00* (2006.01)
*H04W 84/12* (2009.01)

(52) U.S. Cl.
CPC ........ *H04L 27/2621* (2013.01); *H04L 1/0071* (2013.01); *H04L 1/0072* (2013.01);
(Continued)

(58) Field of Classification Search
CPC .. H04L 27/2621; H04L 1/0071; H04L 27/265
See application file for complete search history.

(56) References Cited

U.S. PATENT DOCUMENTS

2014/0153507 A1* 6/2014 Yang .................. H04L 27/2602
370/329
2014/0307650 A1 10/2014 Vermani et al.
(Continued)

FOREIGN PATENT DOCUMENTS

WO WO-2015/064943 A1 5/2015

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Omer S Mian
(74) *Attorney, Agent, or Firm* — McDermott Will & Emery LLP

(57) ABSTRACT

In wireless communications, a high-efficiency (HE) physical layer protocol data unit (PPDU) includes an HE signal-B (SIG-B) field. In order to prevent undesirably large peak-to-average power ratio (PAPR) transmissions caused by repeated information in the HE SIG-B field, the HE SIG-B field may be scrambled. Scrambling of the HE SIG-B field may include scrambling of modulated data tones of each of one or more HE SIG-B field channels of the HE SIG-B field. This scrambling may include applying a phase rotation to the modulated data tones within each of the one or more HE SIG-B field channels. This scrambling (or phase rotation) is performed in addition to a phase rotation applied to each entire HE SIG-B field channel that is commonly referred to as a gamma rotation.

11 Claims, 29 Drawing Sheets

Related U.S. Application Data on Feb. 11, 2016, provisional application No. 62/294,269, filed on Feb. 11, 2016, provisional application No. 62/294,968, filed on Feb. 12, 2016, provisional application No. 62/299,468, filed on Feb. 24, 2016.

(52) U.S. Cl.
CPC ...... *H04L 27/2602* (2013.01); *H04L 27/2627* (2013.01); *H04L 27/2649* (2013.01); *H04W 84/12* (2013.01)

(56) References Cited

U.S. PATENT DOCUMENTS

| | | | |
|---|---|---|---|
| 2015/0312907 A1 | 10/2015 | Lee et al. | |
| 2015/0341154 A1* | 11/2015 | Nakao | H04J 13/0003 375/295 |
| 2016/0088628 A1* | 3/2016 | Zhang | H04L 5/0041 370/329 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

International Search Report and Written Opinion dated Jan. 19, 2017, which issued in International Application No. PCT/US16/60107.

* cited by examiner

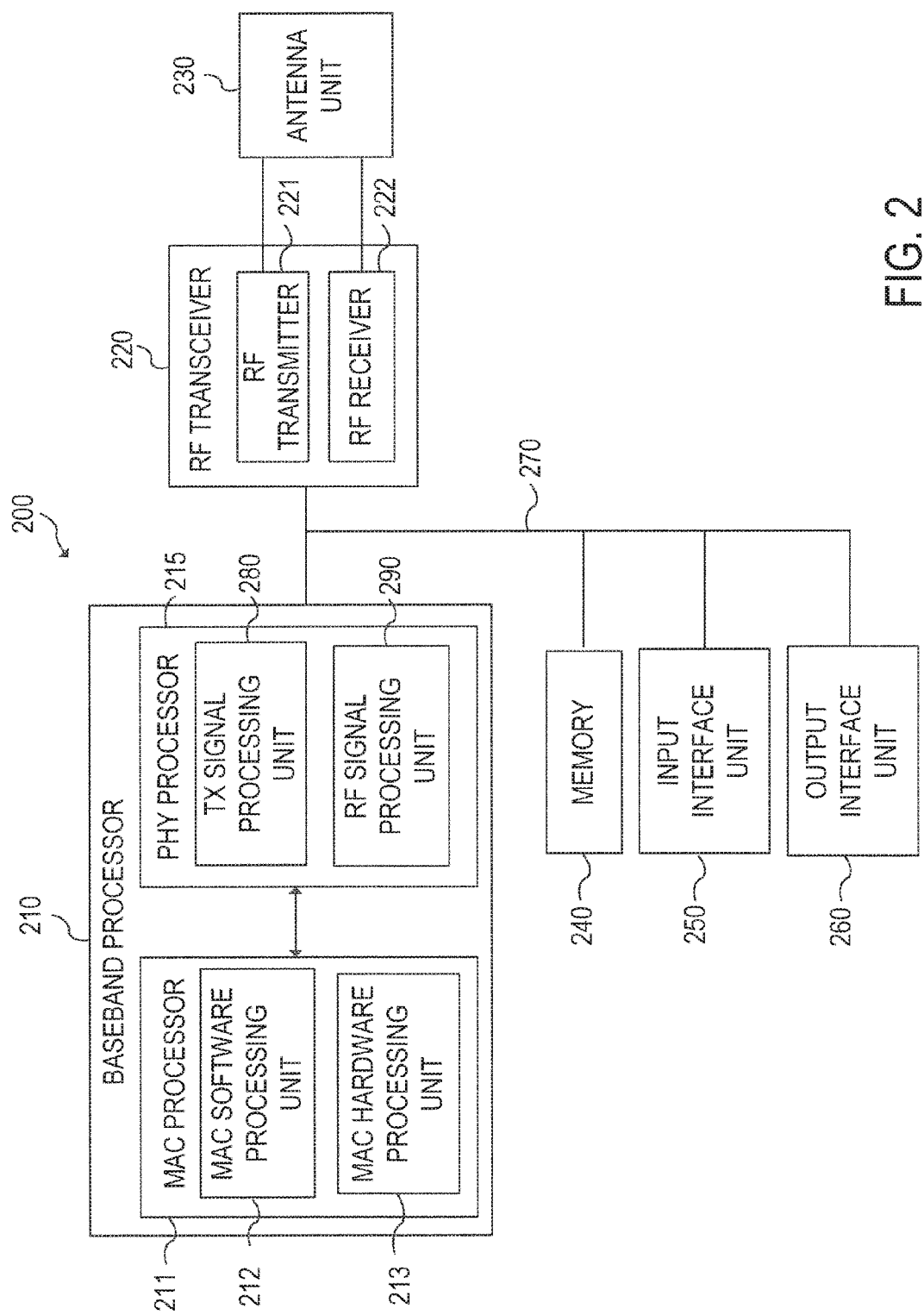

APPARATUS AND METHOD FOR SCRAMBLING CONTROL FIELD INFORMATION FOR WIRELESS COMMUNICATIONS

CROSS-REFERENCE TO RELATED APPLICATIONS

This application claims the benefit of priority from U.S. Provisional Application No. 62/250,373 entitled "Method of scrambling control field information" and filed Nov. 3, 2015; U.S. Provisional Application No. 62/294,248 entitled "Method of scrambling control field information" and filed Feb. 11, 2016; U.S. Provisional Application No. 62/294,269 entitled "Method of scrambling control field information" and filed Feb. 11, 2016; U.S. Provisional Application No. 62/294,968 entitled "Method of scrambling control field information" and filed Feb. 12, 2016; and U.S. Provisional Application No. 62/299,468 entitled "Method of scrambling control field information" and filed Feb. 24, 2016, the entirety of each of which is incorporated herein by reference.

TECHNICAL FIELD

The present description relates in general to wireless communication systems and methods, and more particularly to, for example, without limitation, apparatus and method for scrambling control field information for wireless communications.

BACKGROUND

Wireless local area network (WLAN) devices are deployed in diverse environments. These environments are generally characterized by the existence of access points and non-access point stations. Increased interference from neighboring devices and/or high peak to average power ratio portions of a wireless communication give rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved range and improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 2 illustrates a schematic diagram of an example of a wireless communication device.

Figure 1:
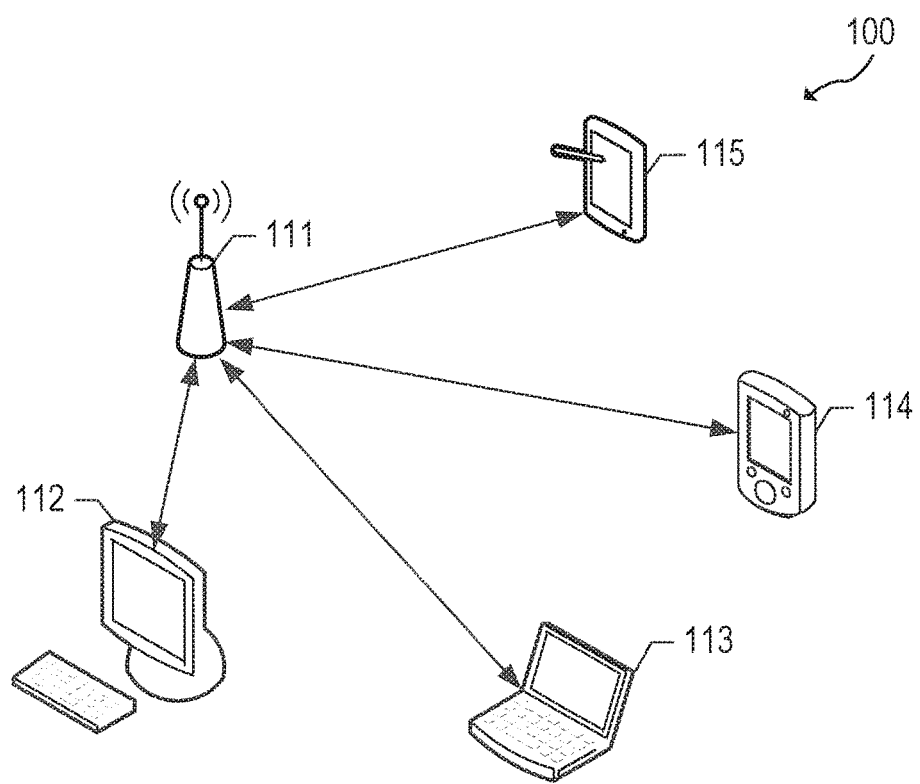
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

A high-efficiency data unit such as a high-efficiency (HE) physical layer convergence procedure (PLCP) protocol data unit (PPDU) may consist of a legacy preamble, various other fields and/or subfields, and an HE-DATA field. The fields may include a signal-A (SIG-A) field and a signal-B (SIG-B) field. The SIG-A and SIG-B fields contain control information. In some scenarios, repeated information in the SIG-B field may create repeated encoded bits of the SIG-B field, which may result in a transmission with an undesirably large peak-to-average power ratio (PAPR). In some scenarios, the HE SIG-B field may cause a very large PAPR when one orthogonal frequency-division multiplexing (OFDM) symbol has all (or almost all) zeros or ones. For example, a broadcast frame may be followed by a unicast frame in which the broadcast frame is likely to consist of all zeros with most fields set to zero and the unicast frame may have the first several fields set to zero. These long sequences of zeros happen to be confined within one or more HE-SIG-B OFDM symbols. Transmissions with high a PAPR may result in a reduction or a backoff of transmit power, which can lead to a loss in performance and coverage.

In some aspects, a method of preventing high PAPR transmissions may include scrambling some or all of the HE SIG-B field to rearrange any repeated information such as long strings of zeros. More particularly, a transmitting device may scramble the control information contents of an HE SIG-B field in an HE PPDU. A scrambling seed value for the scrambling may be, for example, predetermined, broadcasted by an access point (AP) in a management frame or beacon frame, or conveyed in the control information of the SIG-A field in an HE PPDU. When a scrambling seed value is conveyed in the control information of the SIG-A, a BSS color bit field can be used, fully or partially, as the scrambling seed.

In one or more implementations, scrambling may be provided by performing a phase rotation. For example, modulated symbols or data tones within a SIG-B field channel may be multiplied by a scrambling code (e.g., a phase rotation pattern such as a complex valued sequence) to produce scrambled symbols or data tones (e.g., phase rotated symbols or data tones). Scrambling operations may include scrambling the information within one or more HE SIG-B field channels (e.g., within a 20 MHz frequency unit) in addition to performing a phase rotation (sometimes referred to as a gamma rotation) of the entire HE SIG-B field channels. The scrambling operations within each HE SIG-B field channel may help prevent a large PAPR transmission caused by repeated bits within the SIG-B field channel, thus improving communication performance and coverage.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device. e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
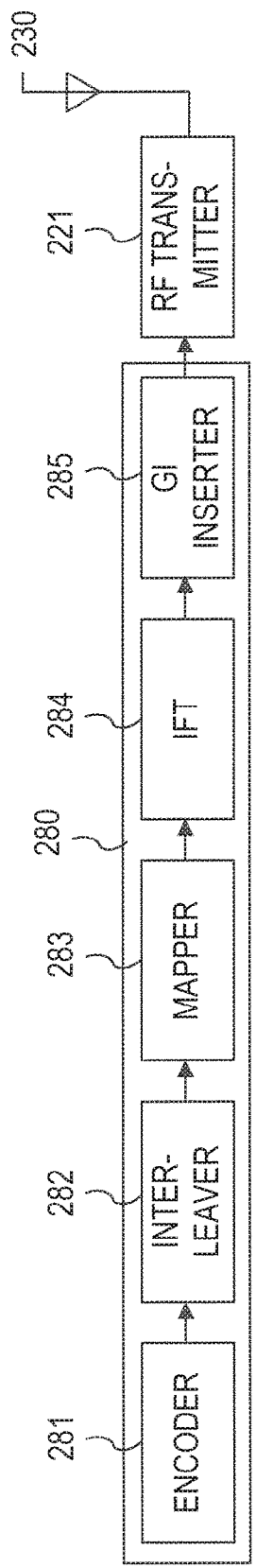
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The transmitting signal processing unit 280 may further include a scrambler for scrambling the input data before encoding to reduce the probability of long sequences of 0s or 1s. If BCC encoding is used in the encoder 281, the transmitting signal processing unit 280 may further include an encoder parser for demultiplexing the scrambled bits among a plurality of BCC encoders. If LDPC encoding is used in the encoder 281, the transmitting signal processing unit 280 may not use the encoder parser.

The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points. If LDPC encoding is used in the encoder 280, the mapper 283 may further perform LDPC tone mapping in addition to constellation mapping.

When MIMO or MU-MIMO is employed, the transmitting signal processing unit 280 may use multiple instances of the interleaver 282 and multiple instances of the mapper 283 corresponding to the number of spatial streams (NSS). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams (NSTS) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (i.e., a OFDM symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
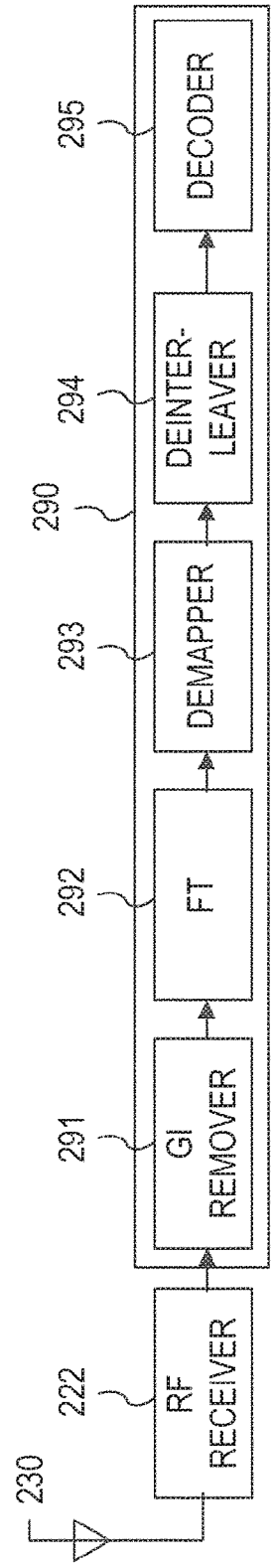
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder. The receiving signal processing unit 290 may further include a descrambler for descrambling the decoded data. If BCC decoding is used in the decoder 295, the receiving signal processing unit 290 may further include an encoder deparser for multiplexing the data decoded by a plurality of BCC decoders. If LDPC decoding is used in the decoder 295, the receiving signal processing unit 290 may not use the encoder deparser.

Figure 4:
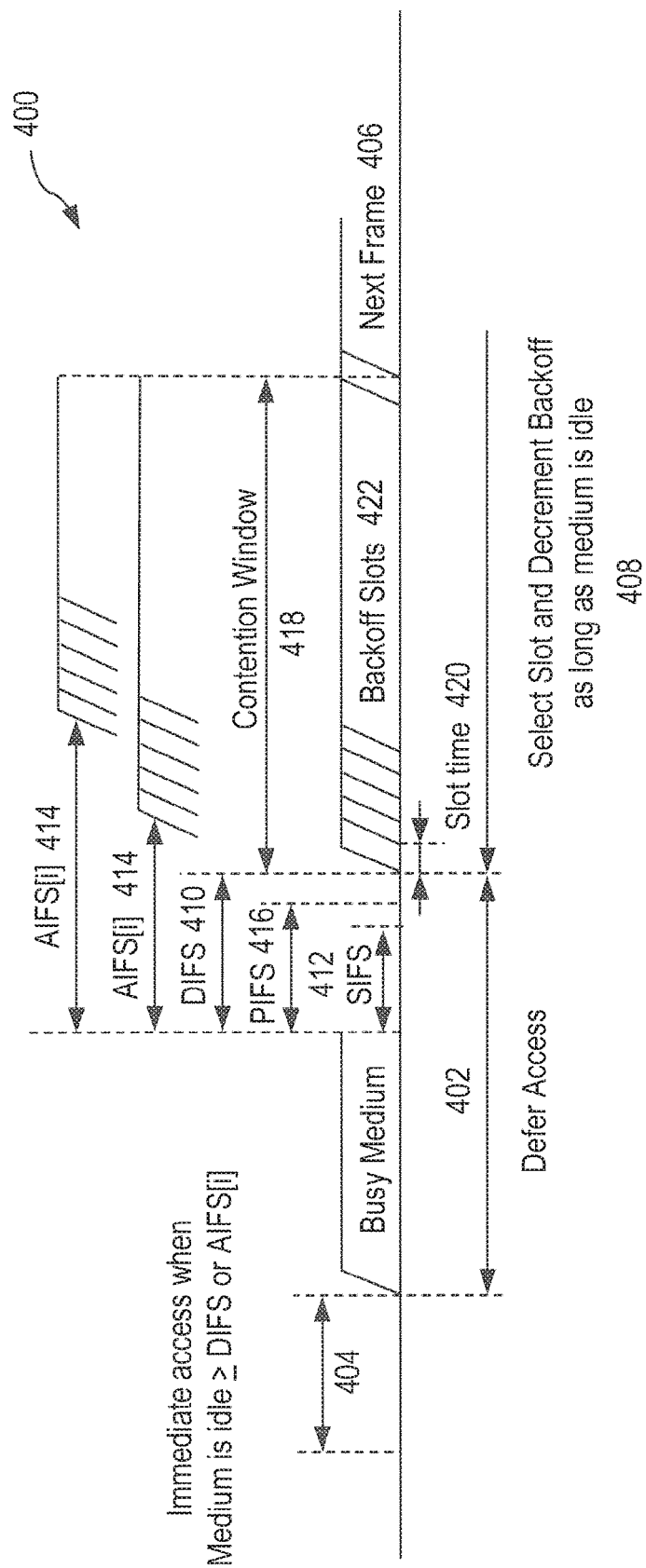
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

In an aspect, the one or more backoff slots 422 may be collectively referred to as a backoff time. In an aspect, the backoff time may be based on a random (e.g., pseudorandom) number within a predetermined interval. For instance, the backoff time may be based on a pseudorandom integer drawn from a uniform distribution over the interval [0, CW], where CW is an integer within the range of values of the PHY characteristics aCWmin and aCWmax such that aCWmin≤CW≤aCWmax. In an aspect, CW may refer to, or may be referred to as, a contention window size, contention window duration, contention window parameter, or a variant thereof.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. For example, the SIFS may be 16 microseconds. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
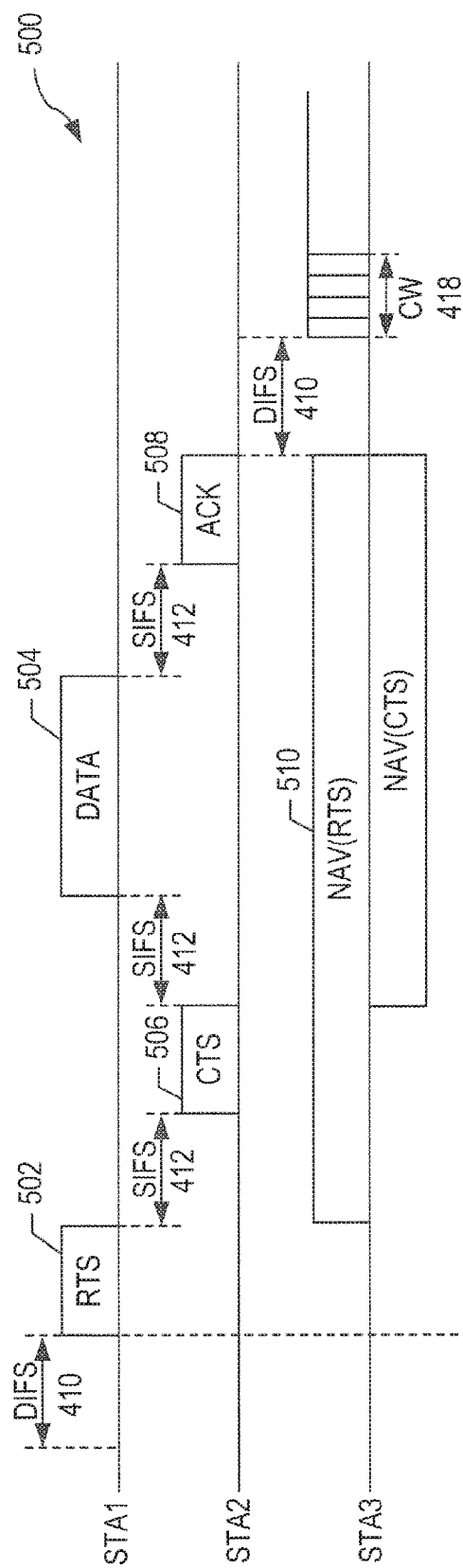
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
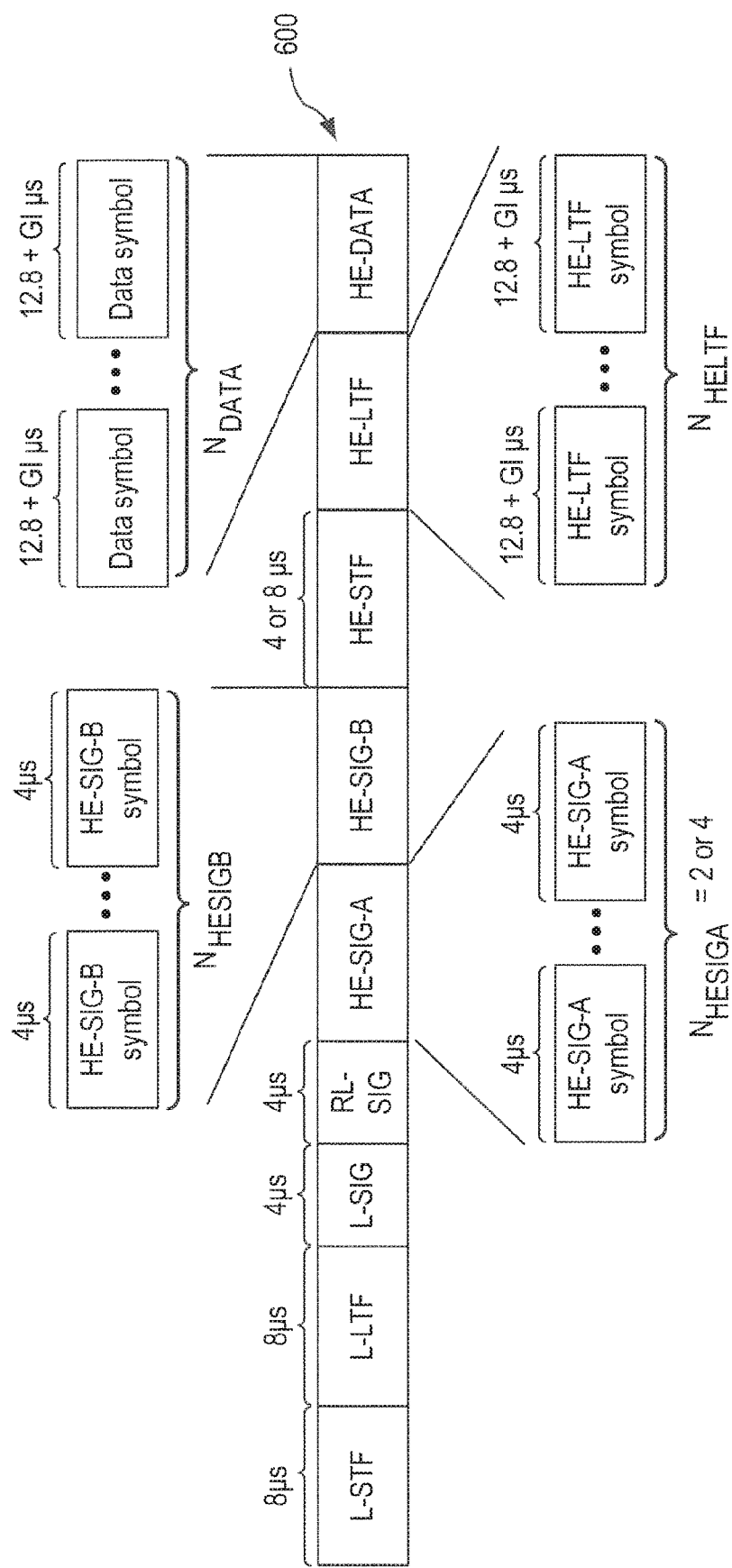
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include NHESIGA symbols, the HE-SIG-B field may include NHESIGB symbols, the HE-LTF field may include NHELTF symbols, and the HE-DATA field may include NDATA symbols. In an aspect, the HE-DATA field may also be referred to as a payload field, data, payload, PSDU, or Media Access Control (MAC) Protocol Data Units (MPDU) (e.g., MAC frame).

The HE-SIG-A field and HE-SIG-B field contain symbols that carry control information associated with each PHY service data unit (PSDU) and/or radio frequency (RF), PHY, and MAC properties of a PPDU. In one aspect, the HE-SIG-A field can be carried/modulated using an FFT size of 64 on a 20 MHz basis. The HE-SIG-B field can be carried/modulated using an FFT size of 64 on a 20 MHz basis. Each of the HE-SIG-A and HE-SIG-B fields may occupy the entire channel bandwidth of the frame (e.g., the entire 20, 40, 80, 80+80 or 160 MHz). In some aspects, the size of the HE-SIG-A field and/or the HE-SIG-B field is variable (e.g., can vary from frame to frame). To facilitate decoding of the HE frame 600 by a receiver, the size of (e.g., number of symbols contained in) the HE-SIG-B field may be indicated in the HE-SIG-A field. An HE-SIG-A field and an HE-SIG-B field may be referred to as an HE SIG-A subfield and an HE SIG-B subfield, respectively.

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Table 1, shown below, provides examples of characteristics associated with the various components of the HE frame 600.

TABLE 1

| | | | | | | |
|---|---|---|---|---|---|---|
| | | | PPDU Frame | | | |
| Element | Definition | Duration | DFT period | GI | Subcarrier Spacing | Description |
| Legacy (L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. Single user |

TABLE 1-continued

| | | | | | | |
|---|---|---|---|---|---|---|
| | | | | PPDU Frame | | |
| Element | Definition | Duration | DFT period | GI | Subcarrier Spacing | Description |
| HE-STF | HE Short Training field | 4 or 8 μs | — | — | non-trigger-based PPDU: (equivalent to) 1,250 kHz; trigger-based PPDU: (equivalent to) 625 kHz | (SU) packets and UL Trigger based packets do not contain HE-SIG-B. HE-STF of a non-trigger-based PPDU has a periodicity of 0.8 μs with 5 periods. A non-trigger-based PPDU is not sent in response to trigger frame. The HE-STF of trigger-based PPDU has a periodicity of 1.6 μs with 5 periods. A trigger-based PPDU is a UL PPDU sent in response to a trigger frame. |
| HE-LTF | HE Long Training field | $N_{HELTF}$ * (DFT period + GI) μs | 2 × LTF: 6.4 μs 4 × LTF: 12.8 μs | supports 0.8, 0.16, 3.2 μs | 2 × LTF: (equivalent to) 156.25 kHz; 4 × LTF: 78.125 kHz | HE PPDU may support 2 × LTF: mode and 4 × LTF: mode. In the 2 × LTF: mode, HE-LTF symbol excluding GI is equivalent to modulating every other tone in an OFDM symbol of 12.8 μs excluding GI, and then removing the second half of OFDM symbol in time domain. $N_{HELTF}$ means the number of HE-LTF symbols and is equal to 1, 2, 4, 6, 8. |
| HE-DATA | HE DATA field | $N_{DATA}$ * (DFT period + GI) μs | 12.8 μs | supports 0.8, 1.6, 3.2 μs | 78.125 kHz | $N_{DATA}$ means the number of HE data symbols. |

Figure 7:
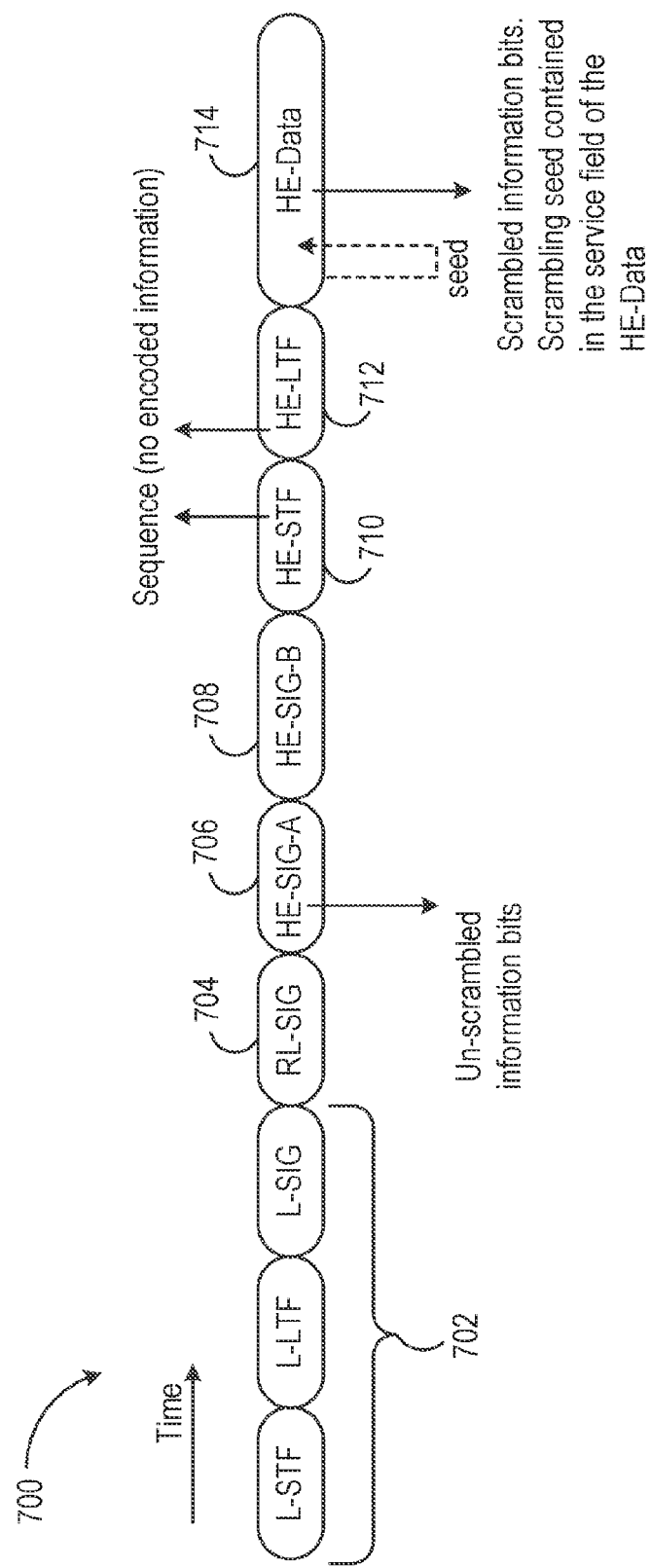
FIG. 7 illustrates an example of an HE physical layer convergence procedure (PLCP) protocol data unit (PPDU).

An HE PPDU such as HE PPDU 700 of FIG. 7 may consist of a legacy preamble 702 (e.g., a L-STF, a L-LTF, and L-SIG field), repeated fields such as a L-SIG (RL-SIG) field 704, a SIG-A field 706, a SIG-B field 708, an HE-STF field 710, an HE-LTF field 712, and an HE-Data field 714. SIG-A field 706 and SIG-B field 708 may contain control information.

An HE-SIG-A field is fixed in size. For example, an HE-SIG-A field can be either 2 OFDM symbols or 4 OFDM symbols long. In scenarios in which 4 OFDM symbols are included, an HE-SIG-A field may be generated by repeating the contents of 2 OFDM symbols. Therefore, in terms of payload size, the HE-SIG-A field is always fixed. An HE-SIG-B field is variable in size and may contain a larger payload in comparison with the payload of an associated HE-SIG-A field. The size of the HE-SIG-B field may be indicated in the HE-SIG-A field.

Figure 8:
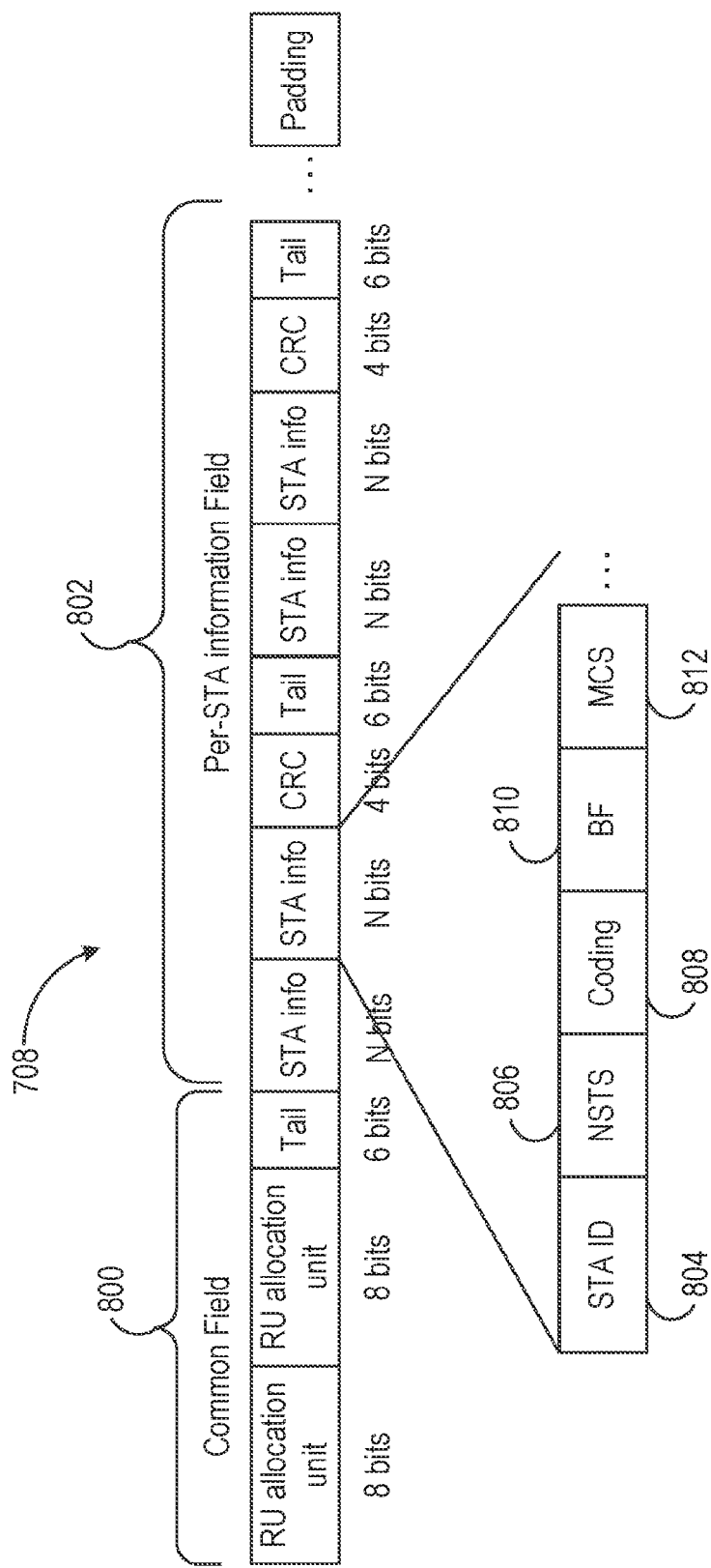
FIG. 8 illustrates an example of an HE signal-B (SIG-B) field of an HE PPDU.

As shown in FIG. 8, a SIG-B field such as SIG-B field 708 may consist of a common field 800 (e.g., common to all STAs) and a per-STA information field 802 that includes STA-specific information for one or more STAs. Per-STA information field 802 may consist of STA identification 804, number of spatial streams (NSTS) 806, coding bit 808, beamforming (BF) bit 810, modulation and coding scheme (MCS) subfield 812, and other subfields. In various scenarios, two or more of the subfields of each per-STA information field 802 can be identical or similar (e.g., two or more of the subfields may include only a few bits that are different and substantially more bits that are identical). This and/or other repeated information of a SIG-B field may create repeated encoded bits of the SIG-B field, and this may result in an undesirably high peak-to-average power ratio (PAPR).

Signals with high PAPR may result in reduction or backoff of transmit power, which leads to loss in performance and coverage. Disclosed herein are various methods of resolving the repeated signal structure of a SIG-B field to prevent undesirably high PAPR transmissions.

In particular, in various embodiments, the control information contents of a SIG-B field in an HE PPDU may be scrambled. Scrambling of SIG-B field information may be performed based on a scrambling seed value in various implementations. The scrambling seed value may be predetermined, may be broadcasted by an AP in, for example, a management frame or beacon frame, or may be conveyed in the control information of a SIG-A field in the HE PPDU. In scenarios in which the scrambling seed value is conveyed in the control information of the SIG-A field, a BSS color bit subfield can be used fully or partially as the scrambling seed value.

Scrambling of information bits may help randomize the information bits. For example, one or more of the various scrambling methods discussed herein may remove one or more repeated bit patterns of in a SIG-B information sequence. More particularly, in various methods discussed herein, scrambling operations are performed to randomize the contents of the SIG-B field. Scrambling operations may include scrambling the information within one or more SIG-B field channels (e.g., within a 20 MHz frequency interval or range) in addition to performing a phase rotation (sometimes referred to as a gamma rotation) of the entire SIG-B field channels. The scrambling operations within each SIG-B field channel may help prevent a large PAPR transmission caused by repeated bits within the SIG-B field channel. The gamma rotation may help prevent large PAPR transmissions caused by repeated SIG-B field channels themselves.

Figure 9:
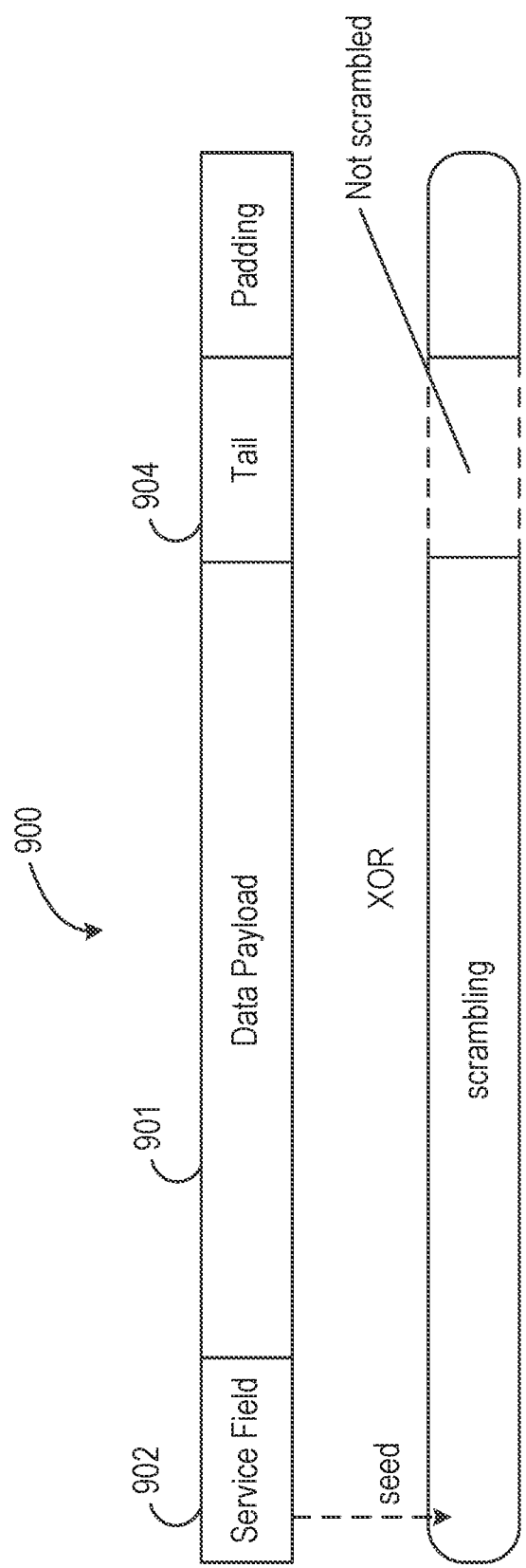
FIG. 9 illustrates an example of data information scrambling for a non-high throughput (non-HT) or HT PPDU.

In accordance with various aspects of the subject technology, as shown in FIG. 9, data information 901 of a non-HT and/or HT PPDU such as PPDU 900 may be scrambled using the contents in the first 7 bits of a service field 902 of the PPDU. Tails bits 904 of PPDU 900 may not be scrambled.

Figure 10:
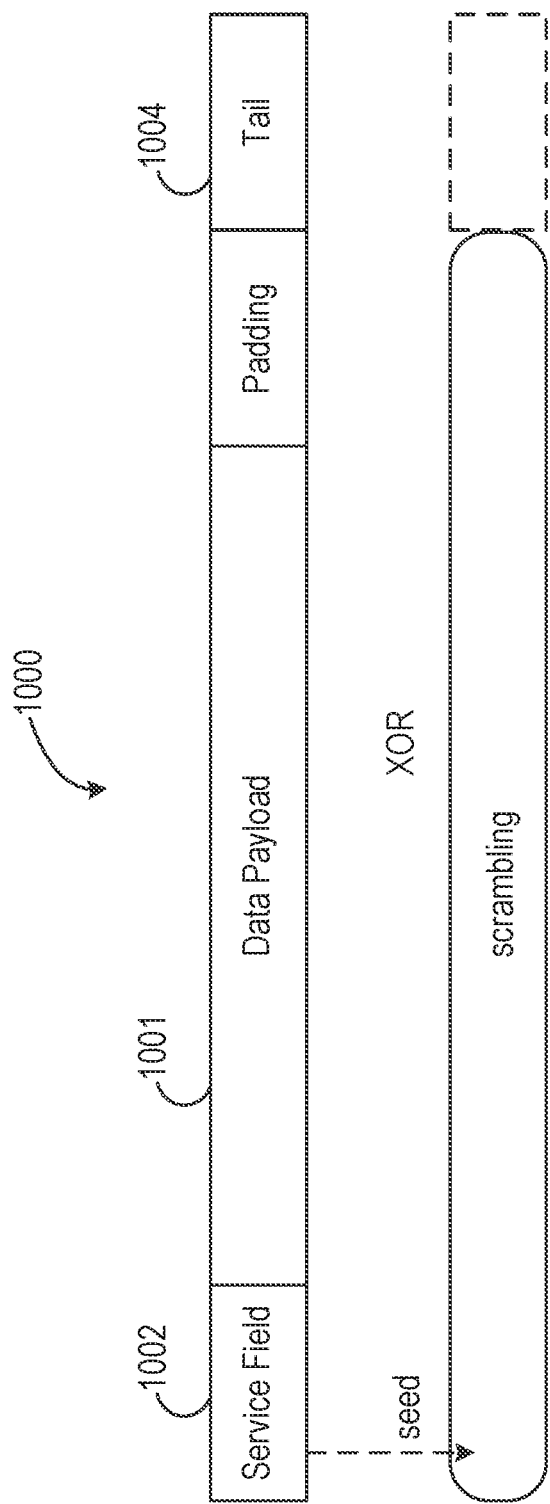
FIG. 10 illustrates an example of data information scrambling for a VHT PPDU.

As shown in FIG. 10, in accordance with various aspects, data information 1001 of a VHT PPDU such as PPDU 1000 may be scrambled using the content in the first 7 bits of the service field 1002. Scrambling of data information bits may be performed until tail bits 1004, which are the last bits of the data information sequence.

However, the HE-SIG-B field does not contain a service field to hold the initial scrambling seed value. Accordingly, for scramble operations for the HE-SIG-B field, the initial scrambling seed may be derived and/or determined by one (or more) of the following methods:

using a BSS color subfield in an HE-SIG-A field as the initial scrambling seed value;

by including an additional and entirely new subfield in the PPDU, the additional subfield dedicated for the as the initial scrambling seed value;

using a fixed value (e.g., a predetermined value set forth in a specification document such an all one initial scrambling seed value) as the initial scrambling seed value;

using the BSSID of the AP as the initial scrambling seed value; and/or using scrambling seed information transmitted by the AP as part of management or beacon frame as the initial scrambling seed value.

Figure 11:
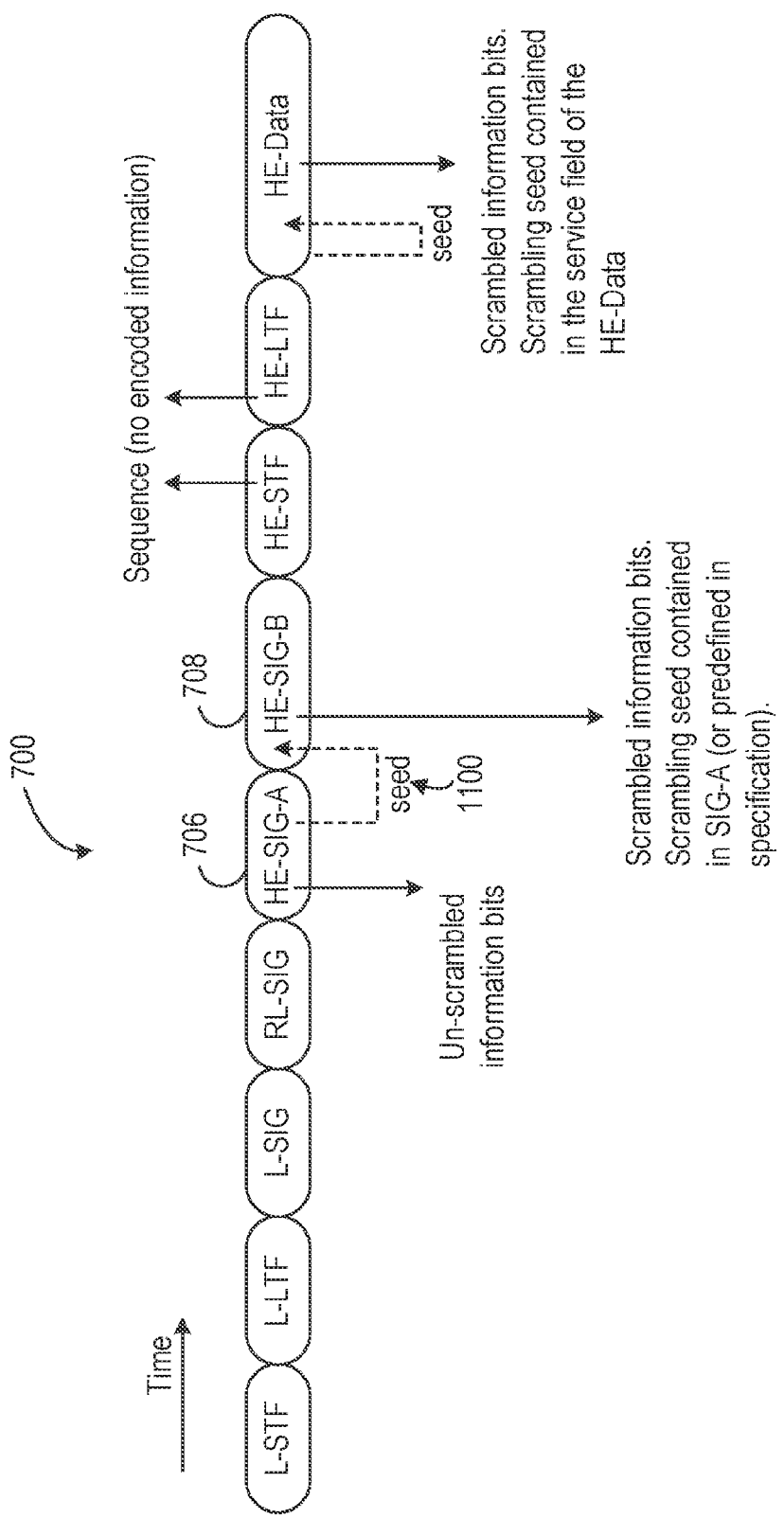
FIG. 11 illustrates an example of a scrambling seed configuration for an HE SIG-B field of an HE PPDU.

In some scenarios in which the BSS color subfield is used as the initial scrambling seed value, the BSS color subfield could be configured to be an all zero bit sequence. However, a scrambling seed set with all zero bit sequence can be problematic. Therefore, in cases in which the BSS color subfield is set to all zeros, the scrambling seed value can be modified to be a non-zero bit sequence, such as an all one bit sequence. An example of an HE-SIG-B field 708 to be scrambled using a scrambling seed 1100 from HE-SIG-A field 706 is shown in FIG. 11.

In various scenarios, HE-SIG-B field 708 may contain two SIG-B field channels. An HE-SIG-B field may include two or more SIG-B field channels in, for example, scenarios in which the transmission bandwidth is larger than 20 MHz, (e.g. in 40 MHz or 80 MHz bandwidth transmission). In scenarios in which an HE-SIG-B field includes more than one SIG-B field channel, the scrambling seed for each SIG-B field channel can be different, but derived from a common scrambling seed value. For example, the second SIG-B field channel may be scrambled with a scrambling seed value that is higher by one (in examples in which the bit sequence is converted into a decimal value) relative to the scrambling seed value of the first SIG-B field channel.

As one example, a 7 bit scrambling seed for may be, '0'+6 bits of BSS color for a first SIG-B field channel, and '1'+6 bits of BSS color for a second SIG-B field channel.

Figure 12:
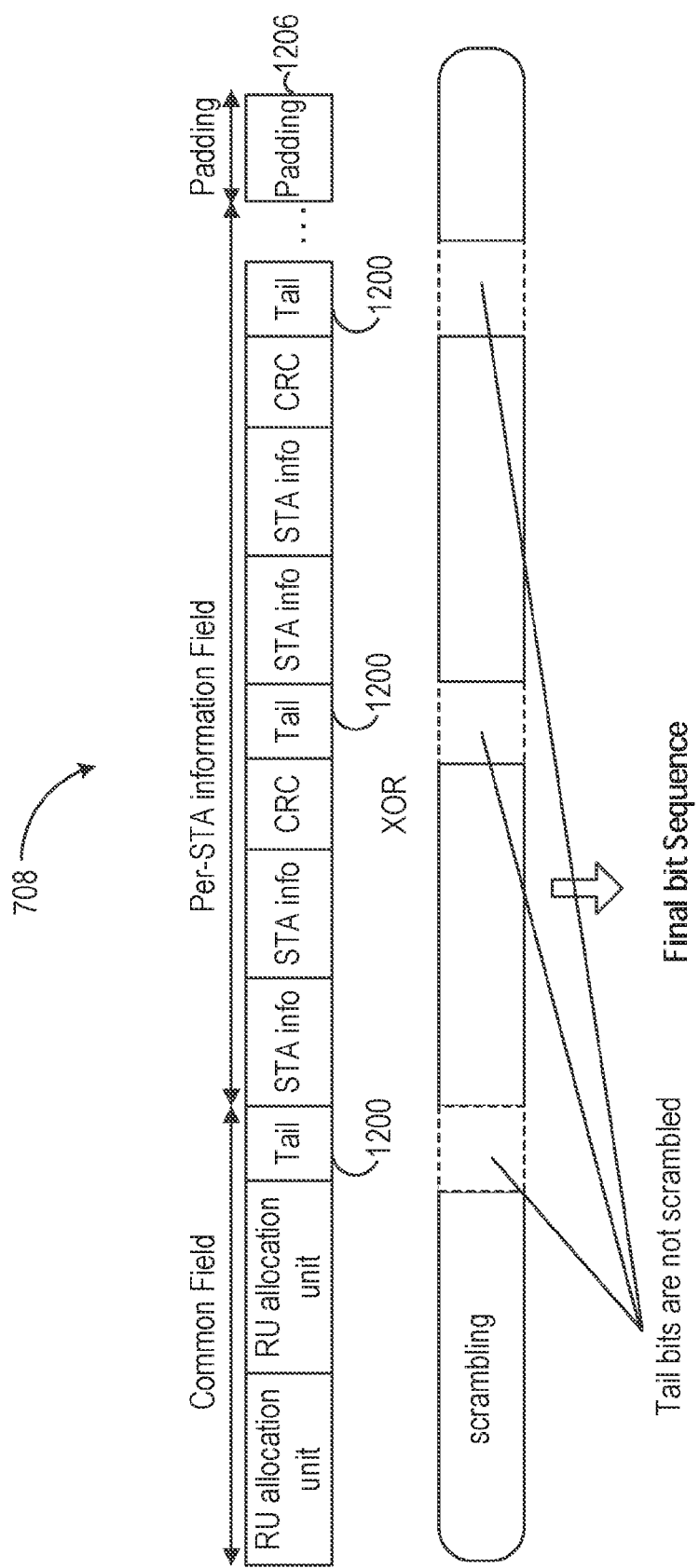
FIG. 12 illustrates an example of a scrambling operation that excludes tail bits of an HE SIG-B field of an HE PPDU.

As shown in FIG. 12, the SIG-B field content may contain more than one tail bit portion 1200 within the bit sequence. In one or more implementations, when the SIG-B field content includes more than one tail bit portion, scrambling operations are not performed on the tail bits 1200 of the SIG-B field (e.g., to ensure that the tail bits contain expected values for decoding operations).

In some scenarios, scrambling operations may make use of maximum length sequences, also known as m-sequences.

In one embodiment, a generator polynomial, S(x), may be defined by Equation 1 below.

$$S(x) = x^7 + x^4 + 1 \qquad \text{Equation (1)}$$

Figure 13:
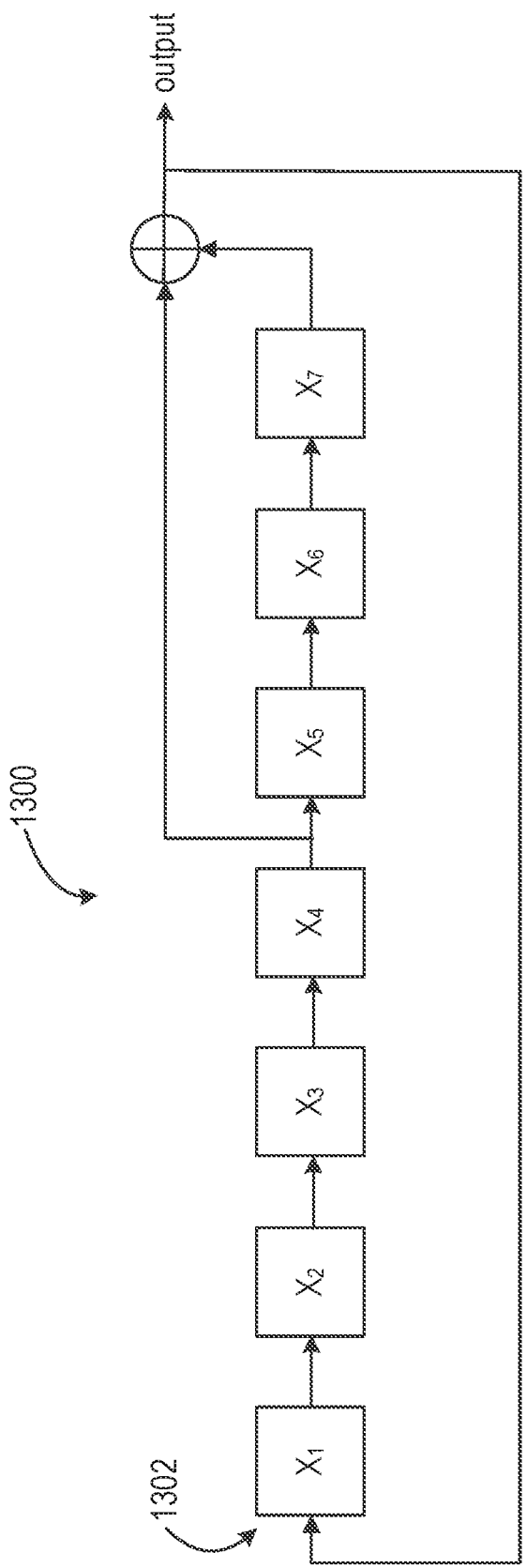
FIG. 13 illustrates an example of a scrambling code generator.

An example of a scrambling code generator 1300 is shown schematically in FIG. 13. As shown in FIG. 13, in some embodiments, 7 bits of an initial scrambling seed value may be written into delay register 1302, with bit values $X_1$ to $X_7$. However, this is merely illustrative.

In some embodiments, scrambling operations may include randomizing (e.g. scrambling) the padding bits 1206 (see FIG. 12) of HE SIG-B field 708. For example, the padding bits may all be set to zero (or may all be set to one) and only padding bits 1206 may be scrambled. In other embodiments, the scrambling bit sequence itself may be used as padding. The final resultant bit sequence in the positions of the padding may be denoted as a padding sequence.

Figure 14:
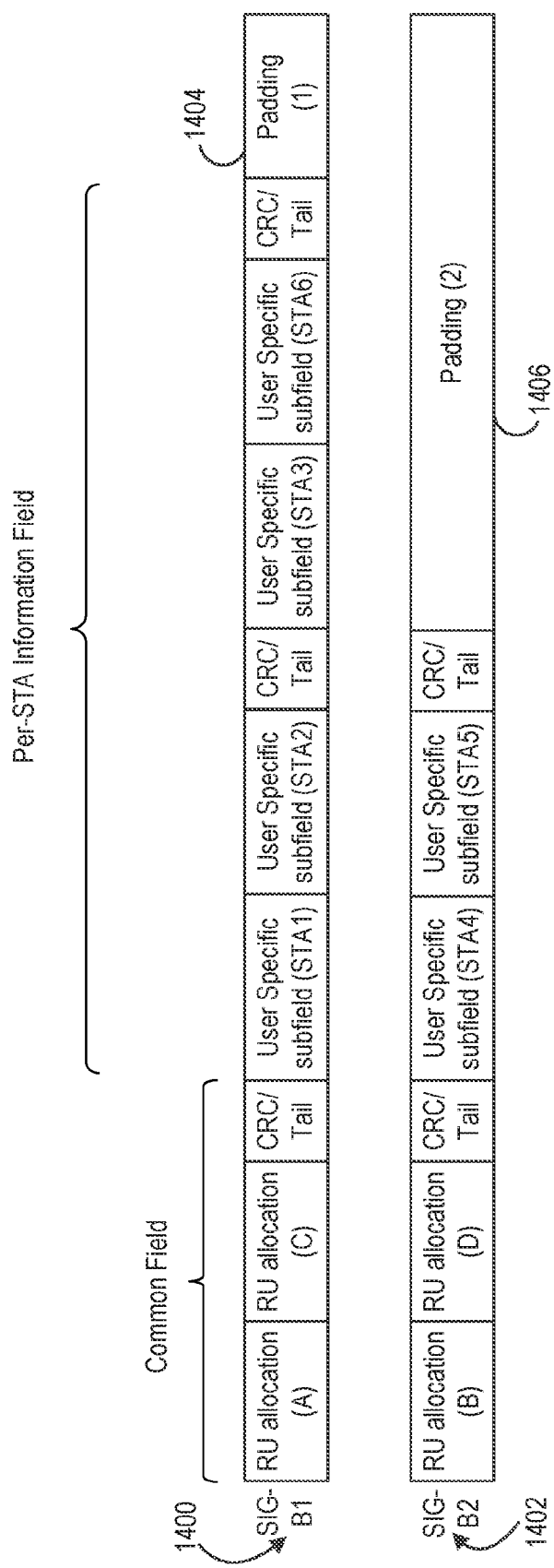
FIG. 14 illustrates an example of multiple HE SIG-B field channels.

As shown in FIG. 14, a first HE SIG-B channel 1400 (e.g., channel 1) and a second HE SIG-B channel 1402 (e.g., channel 2) may include different padding sequences 1404 and 1406 respectively. In the example of FIG. 14, padding 1404 for HE SIG-B channel 1, denoted as padding (1), and padding 1406 for HE SIG-B channel 2, denoted as padding (2), may include different bit sequences.

In one embodiment, providing different padding sequences for channel 1 and 2, may include using different initial seed values for the m-sequence. For example, padding (1) sequence 1404 may be generated by use of an m-sequence with the generating polynomial given in Equation (1) and initial value of [1,1,1,1,1,1,1]. Padding (2) sequence 1406 may be generated by use of an m-sequence with the generating polynomial given in Equation (1) and an initial value of [1,0,0,0,0,0,0] or [0,1,1,1,1,1,1] (as examples).

In some embodiments, to provide a difference between padding sequences 1404 and 1406, initial values for the {x1, x2, x3, x4, x5, x6, x7} register values of the m-sequence can be [1,1,1,1,1,1] and [0,1,1,0,0,0,0], or [1,1,1,1,1,0,0] and [1,1,0,0,0,0,0] (as examples). The resultant padding sequences with these exemplary initial values differ by 63 bit shifts. The rows of Table 2 show the initial value pairs for two padding sequences that result in a difference by 63 shifts. Any one of the initial value pairs noted above may be used.

TABLE 2

| Initial Value of Scrambler in Channel 1 | | | | | | | Initial Value of Scrambler in Channel 2 | | | | | | |
|---|---|---|---|---|---|---|---|---|---|---|---|---|---|
| x1 | x2 | x3 | x4 | x5 | x6 | x7 | x1 | x2 | x3 | x4 | x5 | x6 | x7 |
| 1 | 1 | 1 | 1 | 1 | 1 | 1 | 0 | 0 | 1 | 1 | 0 | 0 | 0 |
| 0 | 1 | 1 | 1 | 1 | 1 | 1 | 1 | 0 | 0 | 1 | 1 | 0 | 0 |
| 0 | 0 | 1 | 1 | 1 | 1 | 1 | 1 | 1 | 0 | 0 | 1 | 1 | 0 |
| 0 | 0 | 0 | 1 | 1 | 1 | 1 | 0 | 1 | 1 | 0 | 0 | 1 | 1 |
| 0 | 0 | 0 | 0 | 1 | 1 | 1 | 1 | 0 | 1 | 1 | 0 | 0 | 1 |
| 1 | 0 | 0 | 0 | 0 | 1 | 1 | 0 | 1 | 0 | 1 | 1 | 0 | 0 |
| 1 | 1 | 0 | 0 | 0 | 0 | 1 | 1 | 0 | 1 | 0 | 1 | 1 | 0 |
| 1 | 1 | 1 | 0 | 0 | 0 | 0 | 0 | 1 | 0 | 1 | 0 | 1 | 1 |
| 0 | 1 | 1 | 1 | 0 | 0 | 0 | 0 | 0 | 1 | 0 | 1 | 0 | 1 |
| 1 | 0 | 1 | 1 | 1 | 0 | 0 | 1 | 0 | 0 | 1 | 0 | 1 | 0 |
| 1 | 1 | 0 | 1 | 1 | 1 | 0 | 1 | 1 | 0 | 0 | 1 | 0 | 1 |
| 1 | 1 | 1 | 0 | 1 | 1 | 1 | 1 | 1 | 1 | 0 | 0 | 1 | 0 |
| 1 | 1 | 1 | 1 | 0 | 1 | 1 | 0 | 1 | 1 | 1 | 0 | 0 | 1 |
| 0 | 1 | 1 | 1 | 1 | 0 | 1 | 1 | 0 | 1 | 1 | 1 | 0 | 0 |
| 0 | 0 | 1 | 1 | 1 | 1 | 0 | 0 | 1 | 0 | 1 | 1 | 1 | 0 |
| 1 | 0 | 0 | 1 | 1 | 1 | 1 | 0 | 0 | 1 | 0 | 1 | 1 | 1 |
| 0 | 1 | 0 | 0 | 1 | 1 | 1 | 1 | 0 | 0 | 1 | 0 | 1 | 1 |
| 1 | 0 | 1 | 0 | 0 | 1 | 1 | 1 | 1 | 0 | 0 | 1 | 0 | 1 |
| 1 | 1 | 0 | 1 | 0 | 0 | 1 | 1 | 1 | 1 | 0 | 0 | 1 | 0 |

TABLE 2-continued

| Initial Value of Scrambler in Channel 1 | | | | | | | Initial Value of Scrambler in Channel 2 | | | | | | |
|---|---|---|---|---|---|---|---|---|---|---|---|---|---|
| x1 | x2 | x3 | x4 | x5 | x6 | x7 | x1 | x2 | x3 | x4 | x5 | x6 | x7 |
| 0 | 1 | 1 | 0 | 1 | 0 | 0 | 1 | 0 | 1 | 1 | 1 | 1 | 0 |
| 0 | 0 | 1 | 1 | 0 | 1 | 0 | 1 | 1 | 0 | 1 | 1 | 1 | 1 |
| 1 | 0 | 0 | 1 | 1 | 0 | 1 | 0 | 1 | 1 | 0 | 1 | 1 | 1 |
| 0 | 1 | 0 | 0 | 1 | 1 | 0 | 1 | 0 | 1 | 1 | 0 | 1 | 1 |
| 0 | 0 | 1 | 0 | 0 | 1 | 1 | 0 | 1 | 0 | 1 | 1 | 0 | 1 |
| 1 | 0 | 0 | 1 | 0 | 0 | 1 | 0 | 0 | 1 | 0 | 1 | 1 | 0 |
| 0 | 1 | 0 | 0 | 1 | 0 | 0 | 0 | 0 | 0 | 1 | 0 | 1 | 1 |
| 0 | 0 | 1 | 0 | 0 | 1 | 0 | 0 | 0 | 0 | 0 | 1 | 0 | 1 |
| 0 | 0 | 0 | 1 | 0 | 0 | 1 | 1 | 0 | 0 | 0 | 0 | 1 | 0 |
| 0 | 0 | 0 | 0 | 1 | 0 | 0 | 0 | 1 | 0 | 0 | 0 | 0 | 1 |
| 0 | 0 | 0 | 0 | 0 | 1 | 0 | 1 | 0 | 1 | 0 | 0 | 0 | 0 |
| 0 | 0 | 0 | 0 | 0 | 0 | 1 | 0 | 1 | 0 | 1 | 0 | 0 | 0 |
| 1 | 0 | 0 | 0 | 0 | 0 | 0 | 1 | 0 | 1 | 0 | 1 | 0 | 0 |
| 0 | 1 | 0 | 0 | 0 | 0 | 0 | 0 | 1 | 0 | 1 | 0 | 1 | 0 |
| 0 | 0 | 1 | 0 | 0 | 0 | 0 | 1 | 0 | 1 | 0 | 1 | 0 | 1 |
| 0 | 0 | 0 | 1 | 0 | 0 | 0 | 1 | 1 | 0 | 1 | 0 | 1 | 0 |
| 1 | 0 | 0 | 0 | 1 | 0 | 0 | 1 | 1 | 1 | 0 | 1 | 0 | 1 |
| 0 | 1 | 0 | 0 | 0 | 1 | 0 | 1 | 1 | 1 | 1 | 0 | 1 | 0 |
| 0 | 0 | 1 | 0 | 0 | 0 | 1 | 1 | 1 | 1 | 1 | 1 | 0 | 1 |
| 1 | 0 | 0 | 1 | 0 | 0 | 0 | 0 | 1 | 1 | 1 | 1 | 1 | 0 |
| 1 | 1 | 0 | 0 | 1 | 0 | 0 | 1 | 0 | 1 | 1 | 1 | 1 | 1 |
| 0 | 1 | 1 | 0 | 0 | 1 | 0 | 0 | 1 | 0 | 1 | 1 | 1 | 1 |
| 1 | 0 | 1 | 1 | 0 | 0 | 1 | 0 | 0 | 1 | 0 | 1 | 1 | 1 |
| 0 | 1 | 0 | 1 | 1 | 0 | 0 | 1 | 0 | 0 | 1 | 0 | 1 | 1 |
| 1 | 0 | 1 | 0 | 1 | 1 | 0 | 0 | 1 | 0 | 0 | 1 | 0 | 1 |
| 0 | 1 | 0 | 1 | 0 | 1 | 1 | 1 | 0 | 1 | 0 | 0 | 1 | 0 |
| 1 | 0 | 1 | 0 | 1 | 0 | 1 | 1 | 1 | 0 | 1 | 0 | 0 | 1 |
| 1 | 1 | 0 | 1 | 0 | 1 | 0 | 0 | 1 | 1 | 0 | 1 | 0 | 0 |
| 0 | 1 | 1 | 0 | 1 | 0 | 1 | 1 | 0 | 1 | 1 | 0 | 1 | 0 |
| 0 | 0 | 1 | 1 | 0 | 1 | 0 | 0 | 1 | 0 | 1 | 1 | 0 | 1 |
| 0 | 0 | 0 | 1 | 1 | 0 | 1 | 1 | 0 | 1 | 0 | 1 | 1 | 0 |
| 0 | 0 | 0 | 0 | 1 | 1 | 0 | 0 | 1 | 0 | 1 | 0 | 1 | 1 |
| 1 | 0 | 0 | 0 | 0 | 1 | 1 | 1 | 1 | 1 | 0 | 1 | 0 | 1 |
| 1 | 1 | 0 | 0 | 0 | 0 | 1 | 1 | 1 | 1 | 1 | 0 | 1 | 0 |
| 0 | 1 | 1 | 0 | 0 | 0 | 0 | 1 | 1 | 1 | 1 | 1 | 0 | 1 |
| 0 | 0 | 1 | 1 | 0 | 0 | 0 | 1 | 0 | 1 | 1 | 1 | 1 | 0 |
| 1 | 0 | 1 | 1 | 1 | 0 | 0 | 0 | 1 | 0 | 1 | 1 | 1 | 1 |
| 1 | 1 | 0 | 1 | 1 | 1 | 0 | 0 | 0 | 1 | 0 | 1 | 1 | 1 |
| 1 | 1 | 1 | 0 | 1 | 1 | 1 | 1 | 0 | 0 | 1 | 0 | 1 | 1 |
| 1 | 1 | 1 | 1 | 0 | 1 | 1 | 1 | 1 | 0 | 0 | 1 | 0 | 1 |
| 0 | 1 | 1 | 1 | 1 | 0 | 1 | 1 | 1 | 1 | 0 | 0 | 1 | 0 |
| 1 | 0 | 1 | 1 | 1 | 1 | 0 | 0 | 1 | 1 | 1 | 0 | 0 | 1 |
| 1 | 1 | 0 | 1 | 1 | 1 | 1 | 1 | 0 | 1 | 1 | 1 | 0 | 0 |
| 0 | 0 | 1 | 1 | 0 | 0 | 1 | 0 | 0 | 0 | 1 | 1 | 1 | 0 |
| 1 | 0 | 1 | 1 | 0 | 1 | 0 | 1 | 0 | 0 | 0 | 1 | 1 | 1 |
| 1 | 1 | 1 | 0 | 0 | 0 | 1 | 1 | 1 | 0 | 0 | 0 | 1 | 1 |
| 1 | 0 | 0 | 0 | 0 | 1 | 0 | 1 | 1 | 1 | 0 | 0 | 0 | 1 |
| 0 | 1 | 0 | 0 | 0 | 0 | 1 | 1 | 1 | 1 | 1 | 0 | 0 | 0 |
| 1 | 0 | 0 | 0 | 0 | 0 | 0 | 0 | 1 | 1 | 1 | 1 | 0 | 0 |
| 1 | 0 | 0 | 0 | 0 | 0 | 0 | 0 | 0 | 0 | 0 | 0 | 0 | 1 |

TABLE 2-continued

| Initial Value of Scrambler in Channel 1 | | | | | | | Initial Value of Scrambler in Channel 2 | | | | | | |
|---|---|---|---|---|---|---|---|---|---|---|---|---|---|
| x1 | x2 | x3 | x4 | x5 | x6 | x7 | x1 | x2 | x3 | x4 | x5 | x6 | x7 |
| 0 | 1 | 0 | 1 | 0 | 0 | 0 | 1 | 0 | 0 | 0 | 0 | 0 | 0 |
| 1 | 0 | 1 | 0 | 1 | 0 | 0 | 0 | 1 | 0 | 0 | 0 | 0 | 0 |
| 0 | 1 | 0 | 1 | 0 | 1 | 0 | 0 | 0 | 1 | 0 | 0 | 0 | 0 |
| 1 | 0 | 1 | 0 | 1 | 0 | 1 | 0 | 0 | 0 | 1 | 0 | 0 | 0 |
| 1 | 1 | 0 | 1 | 0 | 1 | 0 | 1 | 0 | 0 | 0 | 1 | 0 | 0 |
| 1 | 1 | 1 | 0 | 1 | 0 | 1 | 0 | 1 | 0 | 0 | 0 | 1 | 0 |
| 1 | 1 | 1 | 1 | 0 | 1 | 0 | 0 | 0 | 1 | 0 | 0 | 0 | 1 |
| 1 | 1 | 1 | 1 | 1 | 0 | 1 | 1 | 0 | 0 | 1 | 0 | 0 | 0 |
| 0 | 1 | 1 | 1 | 1 | 1 | 0 | 1 | 1 | 0 | 0 | 1 | 0 | 0 |
| 1 | 0 | 1 | 1 | 1 | 1 | 1 | 0 | 1 | 1 | 0 | 0 | 1 | 0 |
| 0 | 1 | 0 | 1 | 1 | 1 | 1 | 0 | 0 | 1 | 1 | 0 | 0 | 1 |
| 0 | 0 | 1 | 0 | 1 | 1 | 1 | 0 | 0 | 0 | 1 | 1 | 0 | 0 |
| 1 | 0 | 0 | 1 | 0 | 1 | 1 | 1 | 0 | 0 | 0 | 1 | 1 | 0 |
| 0 | 1 | 0 | 0 | 1 | 0 | 1 | 1 | 1 | 0 | 0 | 0 | 1 | 1 |
| 1 | 0 | 1 | 0 | 0 | 1 | 0 | 1 | 1 | 1 | 0 | 0 | 0 | 1 |
| 0 | 1 | 0 | 1 | 0 | 0 | 1 | 1 | 1 | 1 | 0 | 0 | 0 | 0 |
| 0 | 0 | 1 | 0 | 1 | 0 | 0 | 1 | 1 | 1 | 1 | 0 | 0 | 0 |
| 0 | 0 | 0 | 1 | 0 | 1 | 0 | 0 | 1 | 1 | 1 | 1 | 0 | 0 |
| 1 | 0 | 0 | 0 | 1 | 0 | 1 | 0 | 0 | 1 | 1 | 1 | 1 | 0 |
| 1 | 1 | 0 | 0 | 0 | 1 | 0 | 1 | 0 | 0 | 1 | 1 | 1 | 1 |
| 0 | 1 | 1 | 0 | 0 | 0 | 1 | 1 | 1 | 0 | 0 | 1 | 1 | 1 |
| 1 | 0 | 1 | 1 | 0 | 0 | 0 | 1 | 1 | 1 | 0 | 0 | 1 | 1 |
| 1 | 1 | 0 | 1 | 1 | 0 | 0 | 0 | 1 | 1 | 1 | 0 | 0 | 1 |
| 1 | 1 | 1 | 0 | 1 | 1 | 0 | 0 | 0 | 1 | 1 | 1 | 0 | 0 |
| 0 | 1 | 1 | 1 | 0 | 1 | 1 | 1 | 0 | 0 | 1 | 1 | 1 | 0 |
| 0 | 0 | 1 | 1 | 1 | 0 | 1 | 0 | 1 | 0 | 0 | 1 | 1 | 1 |
| 0 | 0 | 0 | 1 | 1 | 1 | 0 | 0 | 1 | 1 | 0 | 0 | 1 | 1 |
| 1 | 0 | 0 | 0 | 1 | 1 | 1 | 0 | 0 | 1 | 1 | 0 | 0 | 1 |
| 1 | 1 | 0 | 0 | 0 | 1 | 1 | 0 | 0 | 0 | 1 | 1 | 0 | 0 |
| 1 | 1 | 1 | 0 | 0 | 0 | 1 | 1 | 0 | 0 | 0 | 0 | 1 | 1 |
| 1 | 1 | 1 | 1 | 0 | 0 | 0 | 1 | 0 | 0 | 0 | 0 | 0 | 1 |
| 1 | 1 | 1 | 1 | 1 | 0 | 0 | 1 | 1 | 0 | 0 | 0 | 0 | 0 |
| 1 | 1 | 1 | 1 | 1 | 1 | 0 | 0 | 1 | 1 | 0 | 0 | 0 | 0 |

In some embodiments, it is also possible to selectively scramble some fields of the HE SIG-B content. For example, scrambling of the STAID fields of the HE SIG-B content may be performed alone or in combination with scrambling of other fields. In another example, scrambling of the STAID fields and the padding bits of the HE SIG-B content may be performed alone or in combination with scrambling of other fields. It should also be noted that instead of scrambling the padding bits, pseudo random bits may be generated for the padding in some scenarios.

STAID field scrambling can be performed by scrambling the STAID field with some portions of the BSSID bits in some embodiments. Additionally, in order to avoid an all zero value in the STAID field, which may be used for a broadcast ID, an all one value may be used in the broadcast ID.

For example, $$(dec(AID[0:11]) + dec(BSSID[44:47] \oplus BSSID[40:43]) \times 2^5) \bmod 2^{11}, \quad \text{Equation (2)}$$

may be used for scrambling, where dec( ) is a conversion from a binary bit sequence to a decimal integer value, AID is an association identifier, and $\oplus$ is a bitwise XOR operation.

Other examples that may be used for scrambling are:

$$(dec(AID[0:11]) + dec(BSSID[40:47]]) \times 2) \bmod 2^{11}, \quad \text{Equation (3)}$$

or equivalently, $$STAID[0:2] = AID[0:2]$$

$$STAID[3:10] = AID[3:10] \oplus BSSID[40:47] \quad \text{Equation (4)}$$

In various embodiments, scrambling of HE-SIG-B information can be performed before encoding and/or after encoding. For example, a scrambling example is shown in FIG. 12 in which scrambling is performed on information bits prior to an encoding process. Alternatively, it may be possible to scramble information bits after an encoding procedure. In implementations in which scrambling is performed on information bits after the encoding procedure, scrambling may be performed before or after interleaving operations. For convenience, we will denote method 1 as a scrambling procedure performed prior to encoding, and method 2 and 3 as scrambling procedures performed after the encoding procedure. For method 2 scrambling is performed prior to interleaving. For method 3 scrambling is performed after interleaving. Examples of the transmission of HE SIG-B (e.g., by a transmitter device such as a transmitting AP or a transmitting STA) for each of methods 1, 2, and 3 are shown respectively in FIGS. 15, 17, and 19. Examples of the reception of HE SIG-B (e.g., by a STA or other receiving device) for each of methods 1, 2, and 3 are shown respectively in FIGS. 16, 18, and 20.

Figure 15:
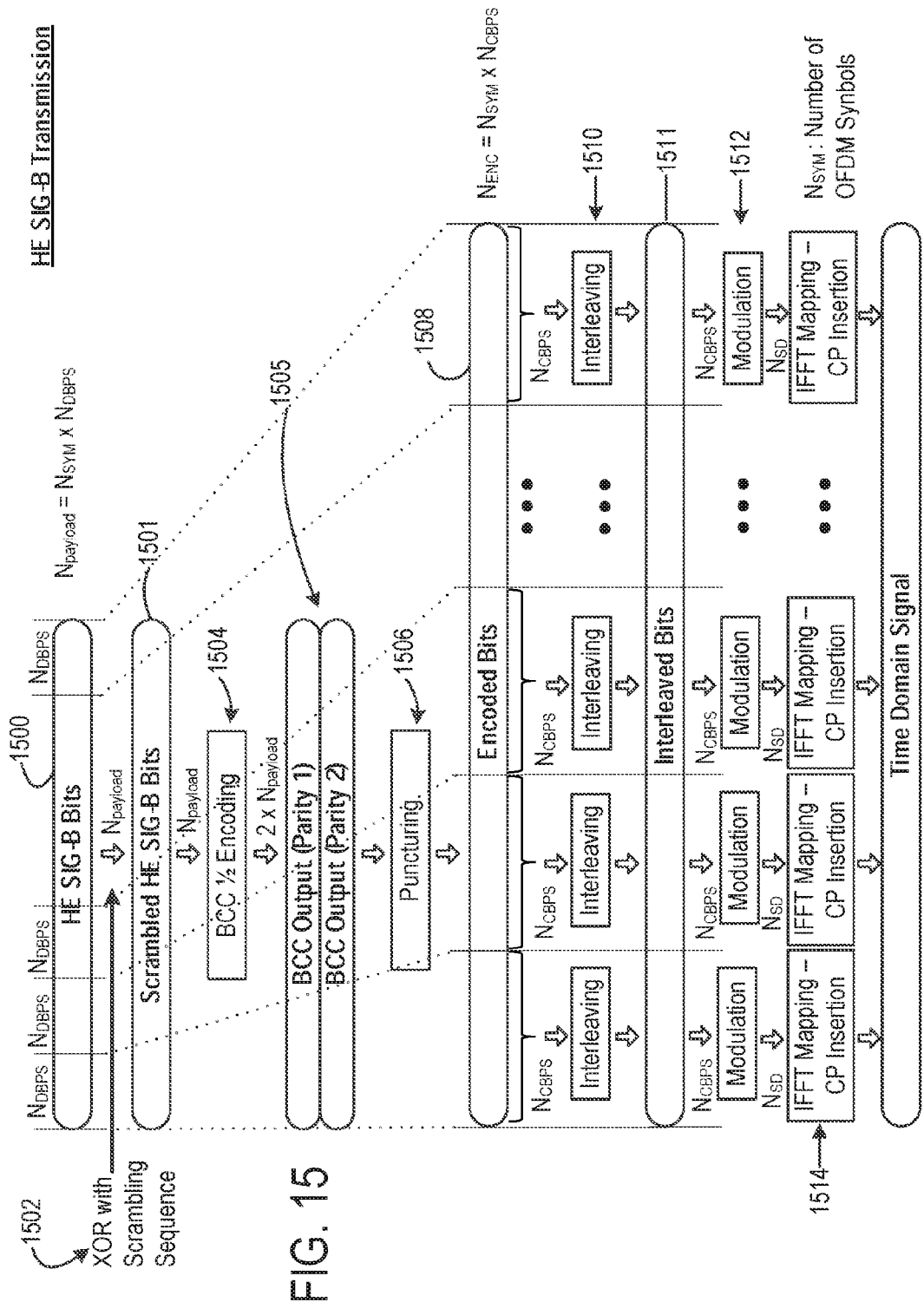
FIG. 15 illustrates an example of a signal processing flow including a scrambling operation within an HE SIG-B field that is performed before encoding.

FIG. 15 shows an example of the signal processing flow of HE SIG-B in accordance with various aspects of method 1. As shown in the example of FIG. 15, HE SIG-B payload bits 1500 (e.g., $N_{payload}$ bits within an HE SIG-B channel are scrambled 1502 (e.g., using an XOR function with a scrambling sequence) to form scrambled HE SIG-B bits 1501. Scrambled HE SIG-B bits 1501 may then be encoded 1504 (e.g., using a 1/2 code rate BCC encoder) to form scrambled encoded bits 1505. The scrambled encoded bits 1505 may be rate-matched (e.g., some bits may be punctured 1506) to meet a target code rate, R (e.g., either 1/2, 2/3, 3/4, or 5/6) to form encoded bits 1508. Next, scrambled, encoded rate-matched signal bits 1508 may be interleaved 1510 (e.g., in units of $N_{CBPS}$) to form interleaved bits 1511. Each $N_{CBPS}$ bits of the interleaved bits 1511 may be modulated 1512 and mapped 1514 to $N_{SD}$ subcarriers (in frequency) of each OFDM symbol.

Figure 16:
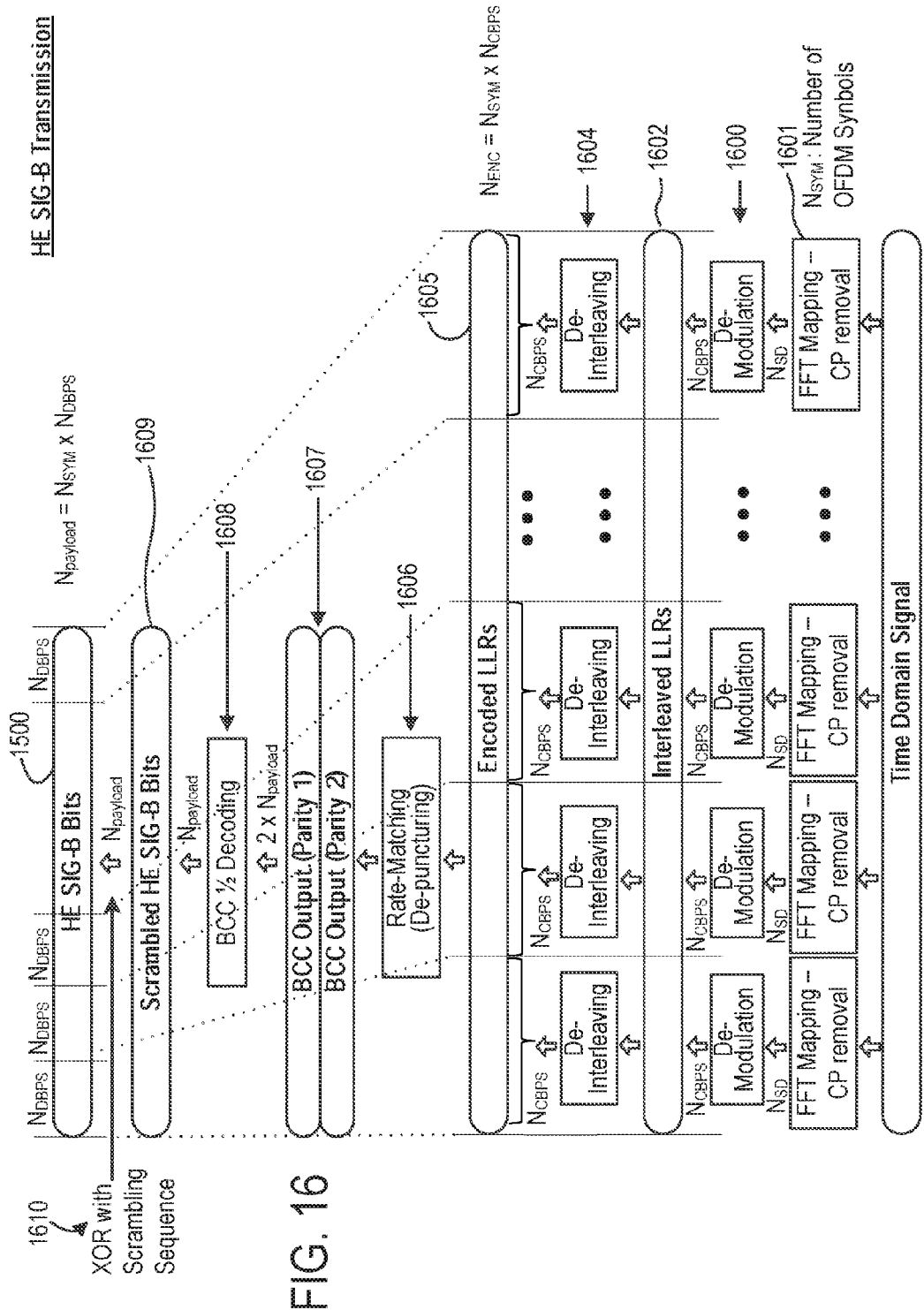
FIG. 16 illustrates an example of a signal reception flow including a de-scrambling operation within an HE SIG-B field that is performed after decoding.

FIG. 16 shows an example of the signal reception flow of HE SIG-B in accordance with various aspects of method 1. As shown in the example of FIG. 16, $N_{SD}$ modulated symbols (in frequency domain) of each OFDM symbol are demapped 1601 and demodulated 1600 into $N_{CBPS}$ interleaved log likelihood ratio (LLR) values 1602. LLR values 1602 may be de-interleaved 1604 to form encoded LLRs 1605 and rate-matched 1606 (e.g., depunctured) to the original 1/2 rate encoding state 1607. The missing (e.g., punctured out) bit positions may be set with zero LLR values and decoded 1608. The decoded bit sequence 1609 may be de-scrambled 1610 to get the final HE SIG-B bit sequence which may be identical to the original HE SIG-B bit sequence 1500.

Figure 17:
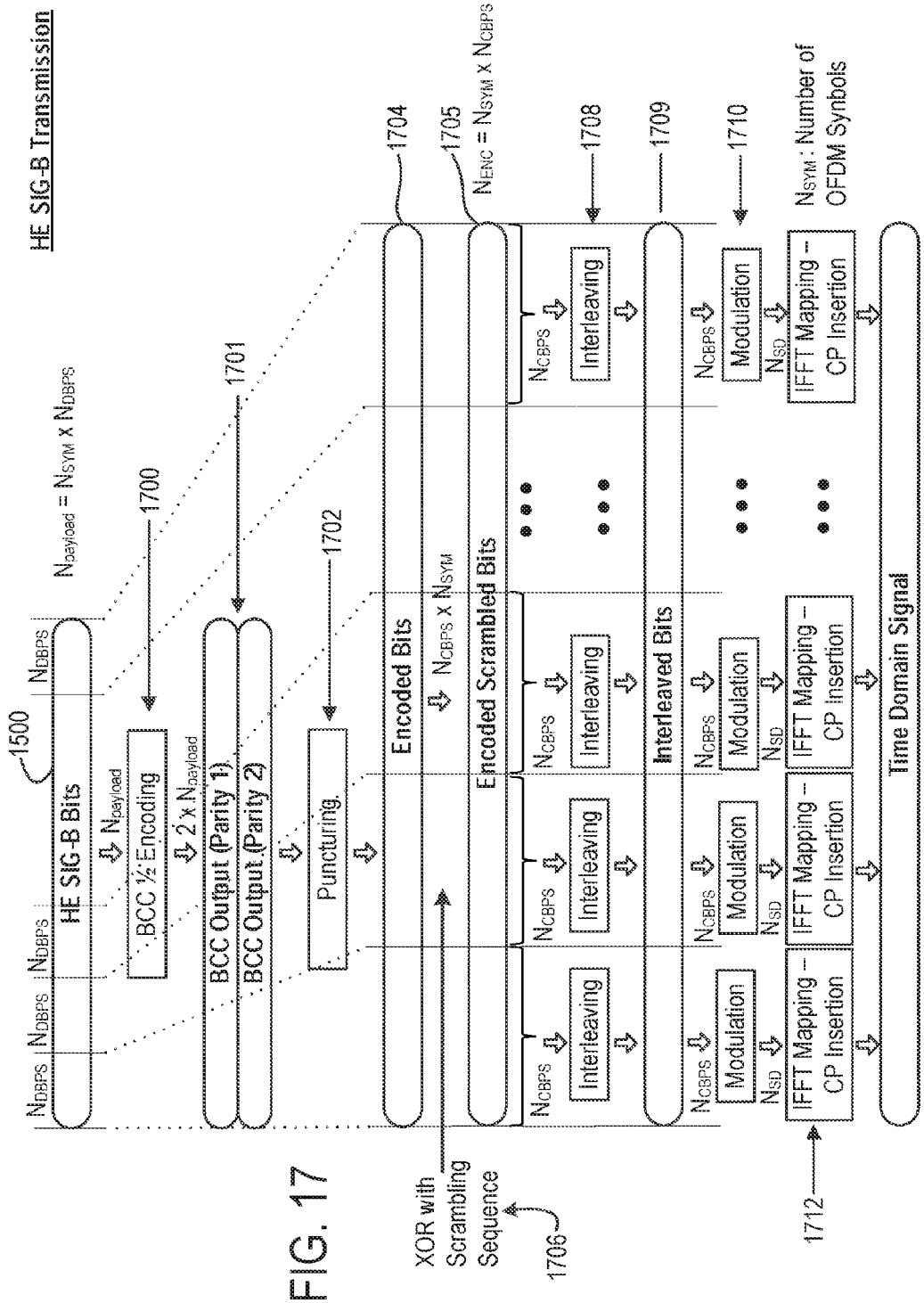
FIG. 17 illustrates an example of a signal processing flow including a scrambling operation within an HE SIG-B field that is performed after encoding.

FIG. 17 shows an example of the signal processing flow of HE SIG-B in accordance with various aspects of method 2. As shown in the example of FIG. 17, HE SIG-B payload bits 1500 (e.g., $N_{payload}$ bits) are encoded 1700 (e.g., using a 1/2 code rate BCC encoder) to form encoded bits 1701. Encoded bits 1701 may be rate-matched 1702 (e.g., some bits may be punctured) to meet a target code rate, R (e.g., either 1/2, 2/3, 3/4, or 5/6). Next, encoded rate-matched signal bits 1704 may be scrambled 1706 to form encoded scrambled bits 1705. Encoded scrambled bits 1705 may be interleaved 1708 (e.g., in units of $N_{CBPS}$) to form encoded scrambled interleaved bits 1709. Each $N_{CBPS}$ bits of encoded scrambled interleaved bits 1709 may be modulated 1710 and mapped 1712 to $N_{SD}$ subcarriers (in frequency) of each OFDM symbol.

Figure 18:
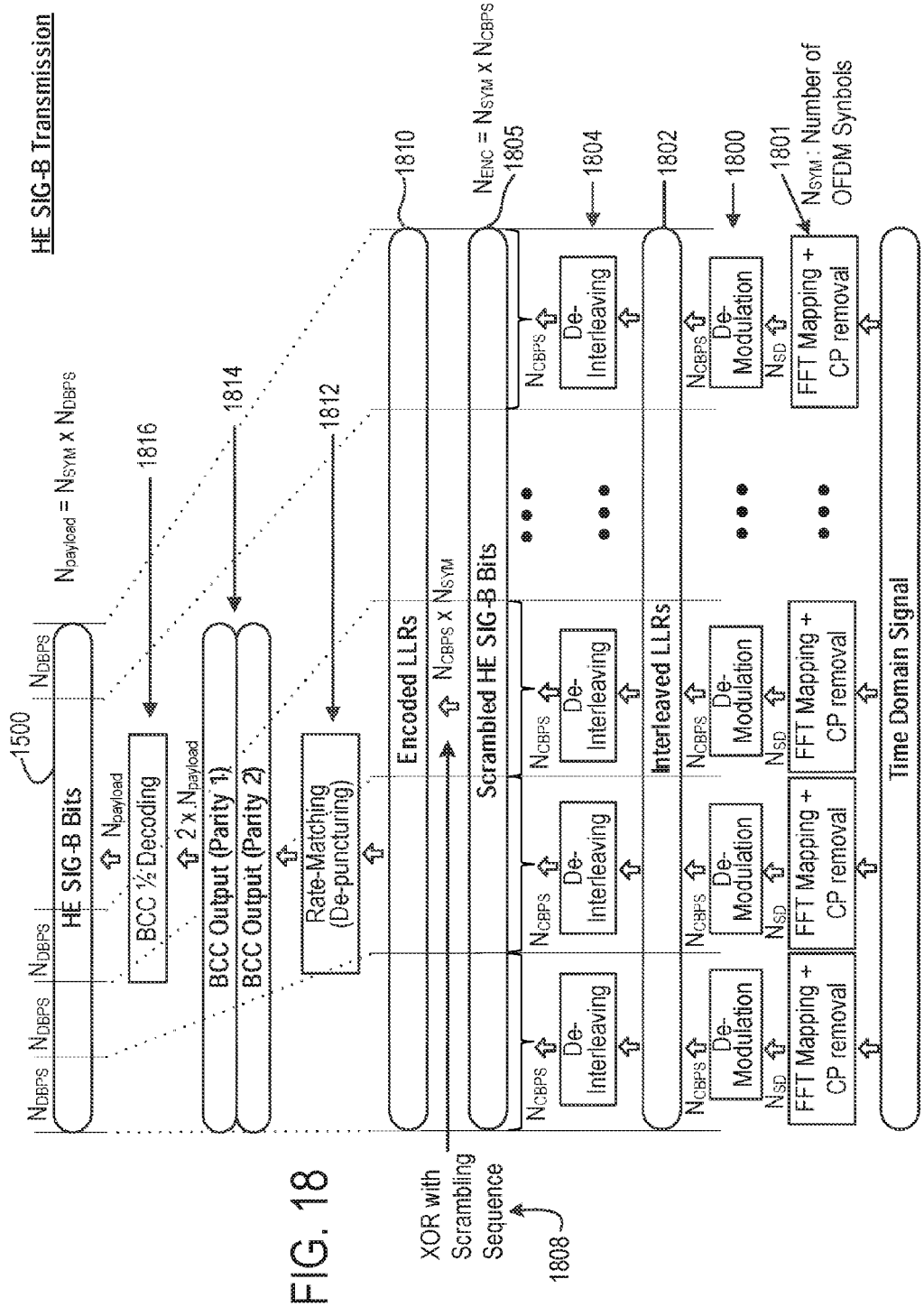
FIG. 18 illustrates an example of a signal reception flow including a de-scrambling operation within an HE SIG-B field that is performed before decoding.

FIG. 18 shows an example of the signal reception flow of HE SIG-B in accordance with various aspects of method 2. As shown in the example of FIG. 18, $N_{SD}$ modulated symbols (in frequency domain) of each OFDM symbol may be demapped 1801 and demodulated 1800 into $N_{CBPS}$ interleaved log likelihood ratio (LLR) values 1802. The LLR values 1802 may be de-interleaved 1804 to form scrambled HE SIG-B bits 1805. Scrambled HE SIG-B bits 1805 may be de-scrambled 1808. The de-scrambled encoded bit sequence 1810 may be rate-matched 1812 to the original 1/2 rate encoding state 1814. For example, missing (e.g., punctured out) bit positions may be set to zero LLR values and decoded 1816 to get the final HE SIG-B bit sequence which may be identical to the original HE SIG-B bit sequence 1500.

Figure 19:
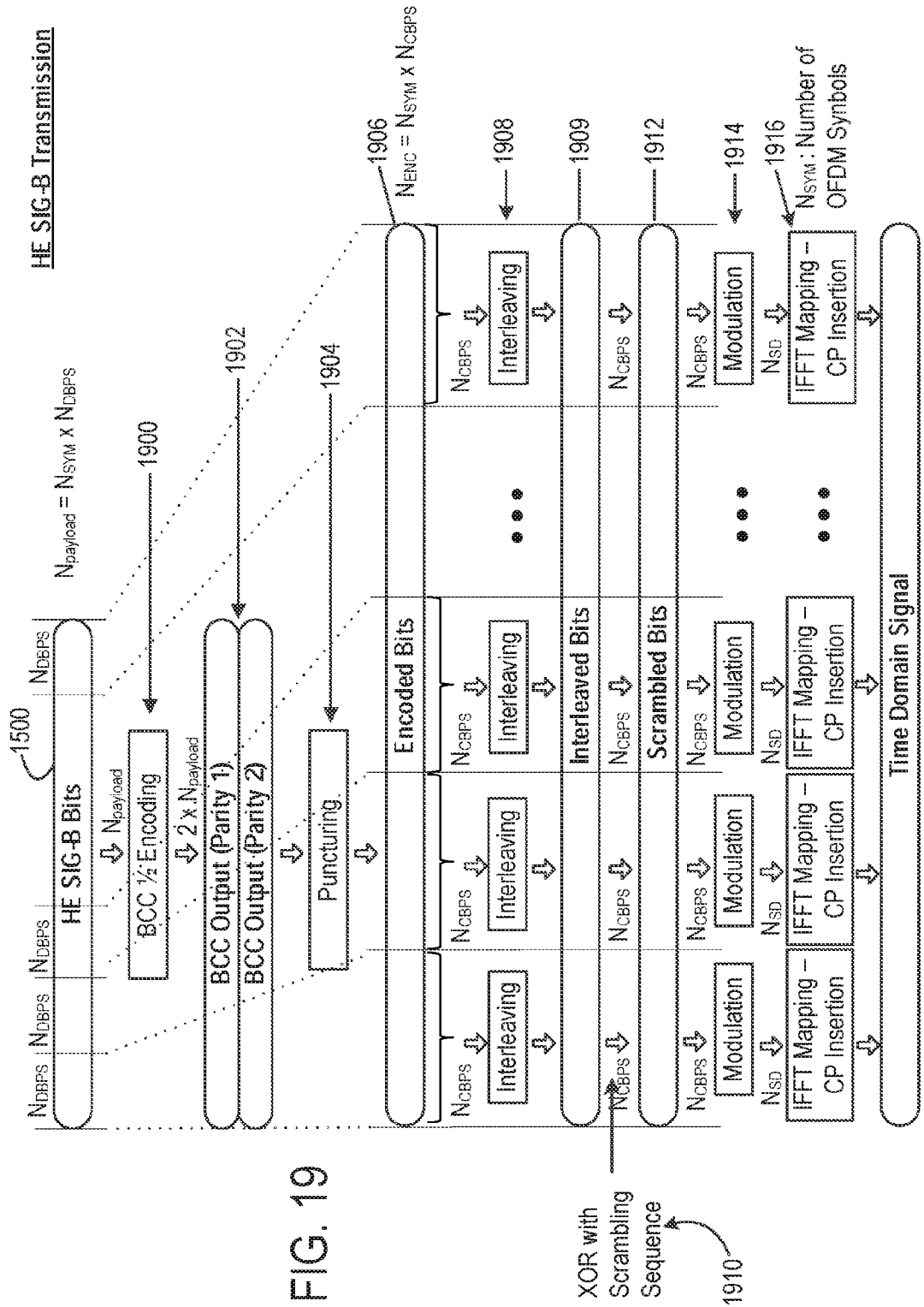
FIG. 19 illustrates an example of a signal processing flow including a scrambling operation within an HE SIG-B field that is performed after interleaving.

FIG. 19 shows an example of the signal processing flow of HE SIG-B in accordance with various aspects of method 3. As shown in FIG. 19, the HE SIG-B payload bits 1500 (e.g., $N_{payload}$ bits) may be encoded 1900 (e.g., using a 1/2 code rate BCC encoder) to form encoded bits 1902. Encoded bits 1902 may be rate-matched 1904 (e.g., some bits may be punctured) to meet target code rate, R (e.g., either 1/2, 2/3, 3/4, or 5/6). Next, encoded rate-match signal bits 1906 may be interleaved (e.g., in units of $N_{CBPS}$) to form interleaved bits 1909. Interleaved bits 1909 may be scrambled 1910 to form scrambled bits 1912. Each $N_{CBPS}$ scrambled bits may be modulated 1914 and mapped 1916 to $N_{SD}$ subcarriers (in frequency) of each OFDM symbol.

Figure 20:
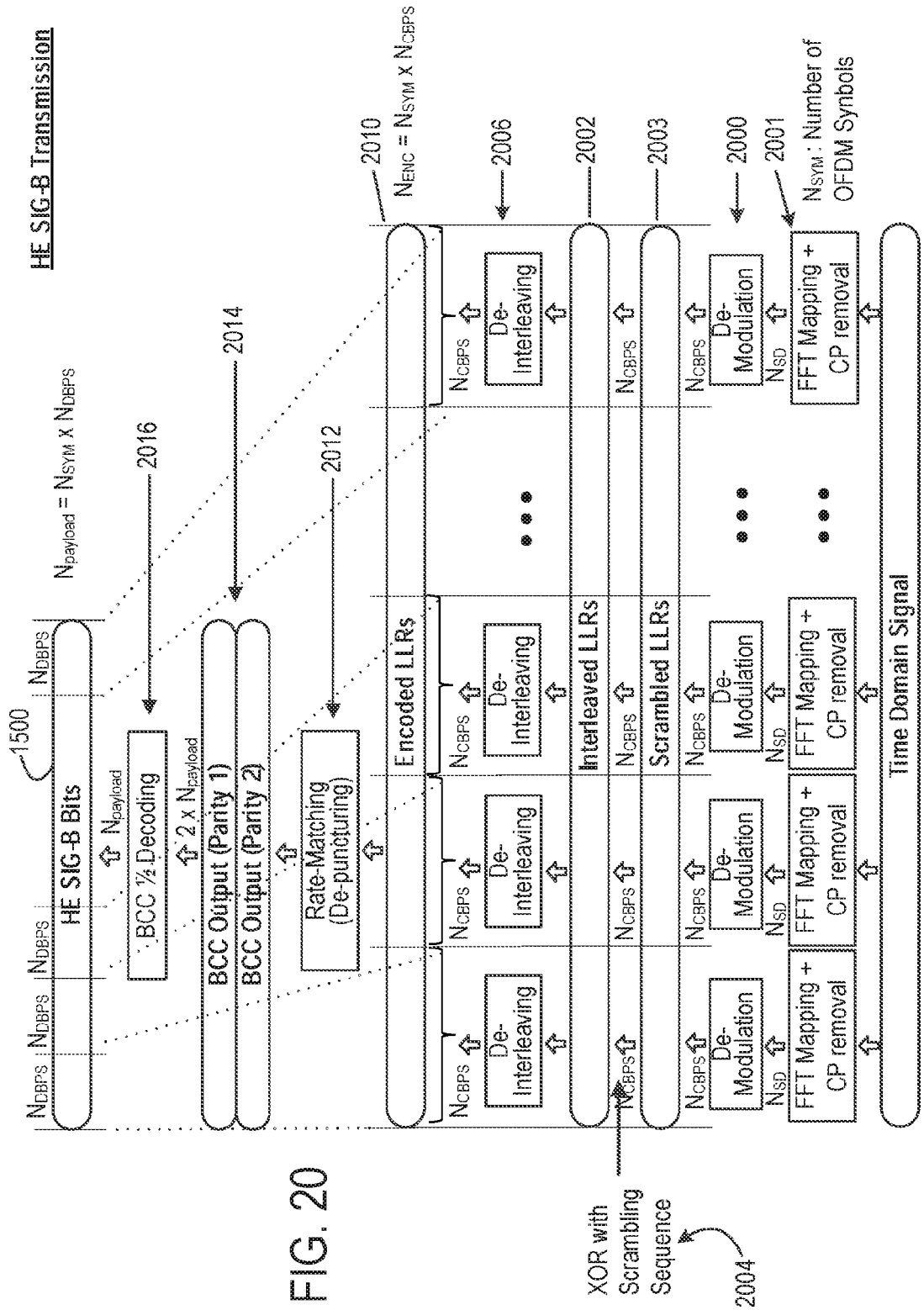
FIG. 20 illustrates an example of a signal reception flow including a de-scrambling operation within an HE SIG-B field that is performed before de-interleaving.

FIG. 20 shows an example of the signal reception flow of HE SIG-B in accordance with various aspects of method 3. As shown in FIG. 20, $N_{SD}$ modulated symbols (in frequency domain) of each OFDM symbol may be demapped 2001 and demodulated 2000 into $N_{CBPS}$ scrambled log likelihood ratio (LLR) values 2003. The scrambled LLRs 2003 may be de-scrambled 2004 to form interleaved LLRs 2002. Interleaved LLRs 2002 may be de-interleaved 2006 to form a de-interleaved encoded LLRs 2010. De-interleaved bit sequence 2010 may be rate-matched 2012 to the original 1/2 rate encoding state 2014. For example, missing (e.g., punctured out) bit positions may be set with zero LLR values and decoded 2016 to obtain the final HE SIG-B bit sequence which may be identical to the original HE SIG-B bit sequence 1500.

Figure 21:
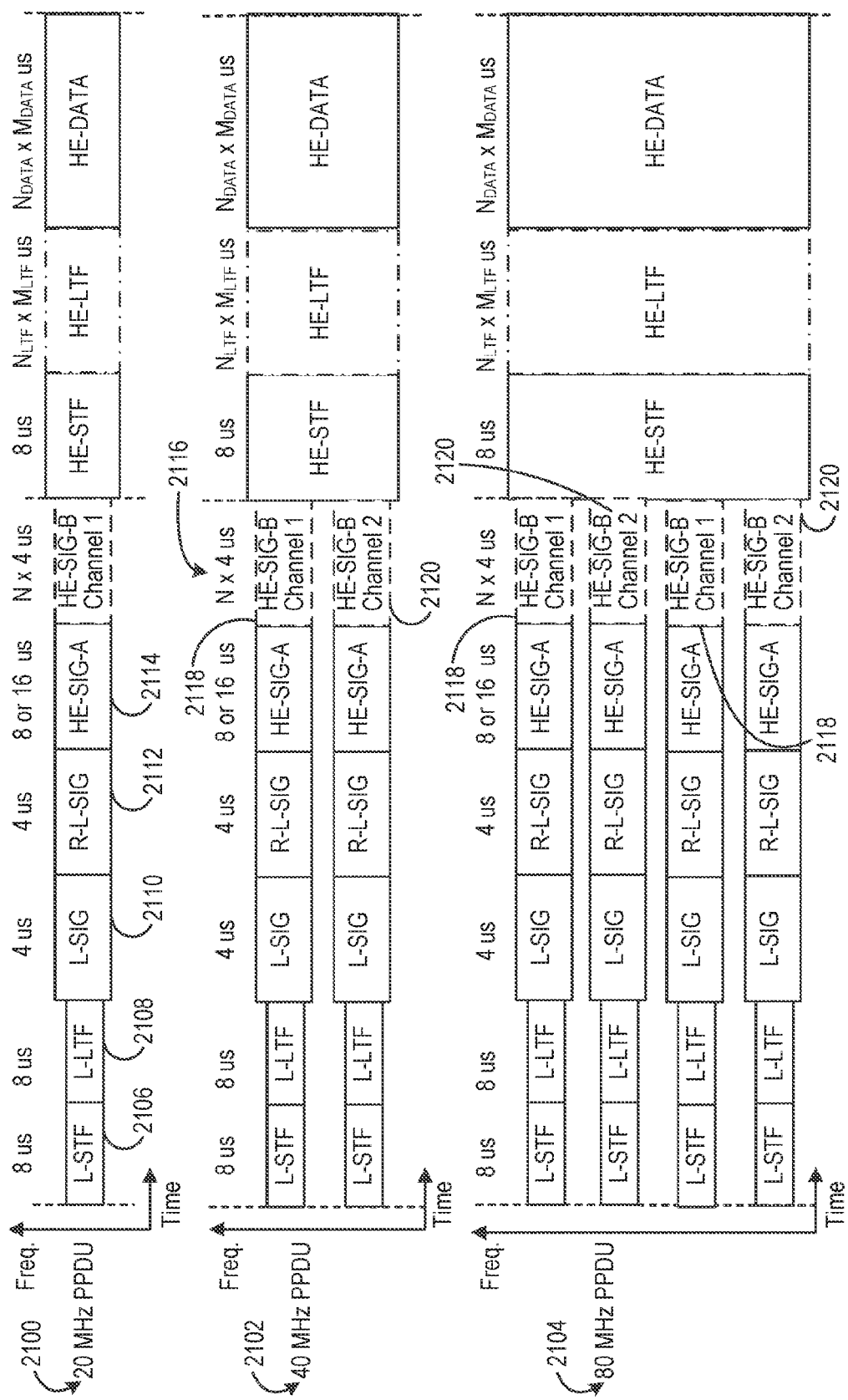
FIG. 21 illustrates an example of 20 MHz, 40 MHz, and 80 MHz data packet transmissions.

In some implementations, more than 20 MHz transmissions may occur. In the case of, for example, 40 MHz, 80 MHz, and 160 MHz transmissions of data packets, some portion of the preamble may be repeated in the frequency domain. FIG. 21 shows an example of data packet transmissions 2100, 2102, and 2104 respectively for 20 MHz. 40 MHz, and 80 MHz transmissions.

As shown in FIG. 21, L-STF 2106, L-LTF 2108, L-SIG 2110, RL-SIG 2112, and HE SIG-A 2114 fields are repeated in units of 20 MHz for a given transmission bandwidth in transmissions 2102 and 2104. If the transmission bandwidth is 40 MHz or above, HE-SIG B field 2116 consists of two SIG-B channels, HE-SIG B "channel 1" 2118 and HE-SIG B "channel 2" 2020. SIG-B channels 2118 and 2120 may contain control information respectively for different sets of STAs. Therefore, content-wise, SIG-B channels 2118 and 2120 channel may be different. In the case of 80 MHz transmission 2104, each of SIG-B channels 2118 and 2120 may be repeated as shown in FIG. 21. In the case of 160 MHz transmission (not shown), each of SIG-B channels 2118 and 2120 may be repeated four times.

However, in OFDM systems, duplication of a signal in frequency typically results in an undesirably high peak to average power ratio (PAPR). To avoid this type of undesirably high PAPR for the preamble portion of the data packet, phase rotation values may be multiplied to each 20 MHz unit (e.g., each of channels 2118 and 2120), in what is sometimes referred to as a gamma rotation. For example, for a gamma rotation in a 40 MHz transmission, a multiplication factor gamma such as '+1' may be multiplied to the lower 20 MHz frequency of the HE SIG-B field and a different multiplication factor gamma such as '+j' (e.g., where j is the imaginary unit which satisfies the equation $j^2=-1$) may be multiplied to the upper 20 MHz frequency. For example, for a gamma rotation in an 80 MHz transmission, elements of the sequence, {'+1', '−1', '−1', '−1'}, may be multiplied to each 20 MHz frequency, starting from the lowest 20 MHz frequency.

This gamma rotation by multiplication of the phase rotation values may help reduce the PAPR of the preamble portion, with the exception of the HE SIG-B field. This is because the HE SIG-B field is not necessarily a full replica of the signal in frequency domain because there are two HE SIG-B channels that may be repeated, as noted above, for 40, 80, and 160 MHz transmission.

Figure 22:
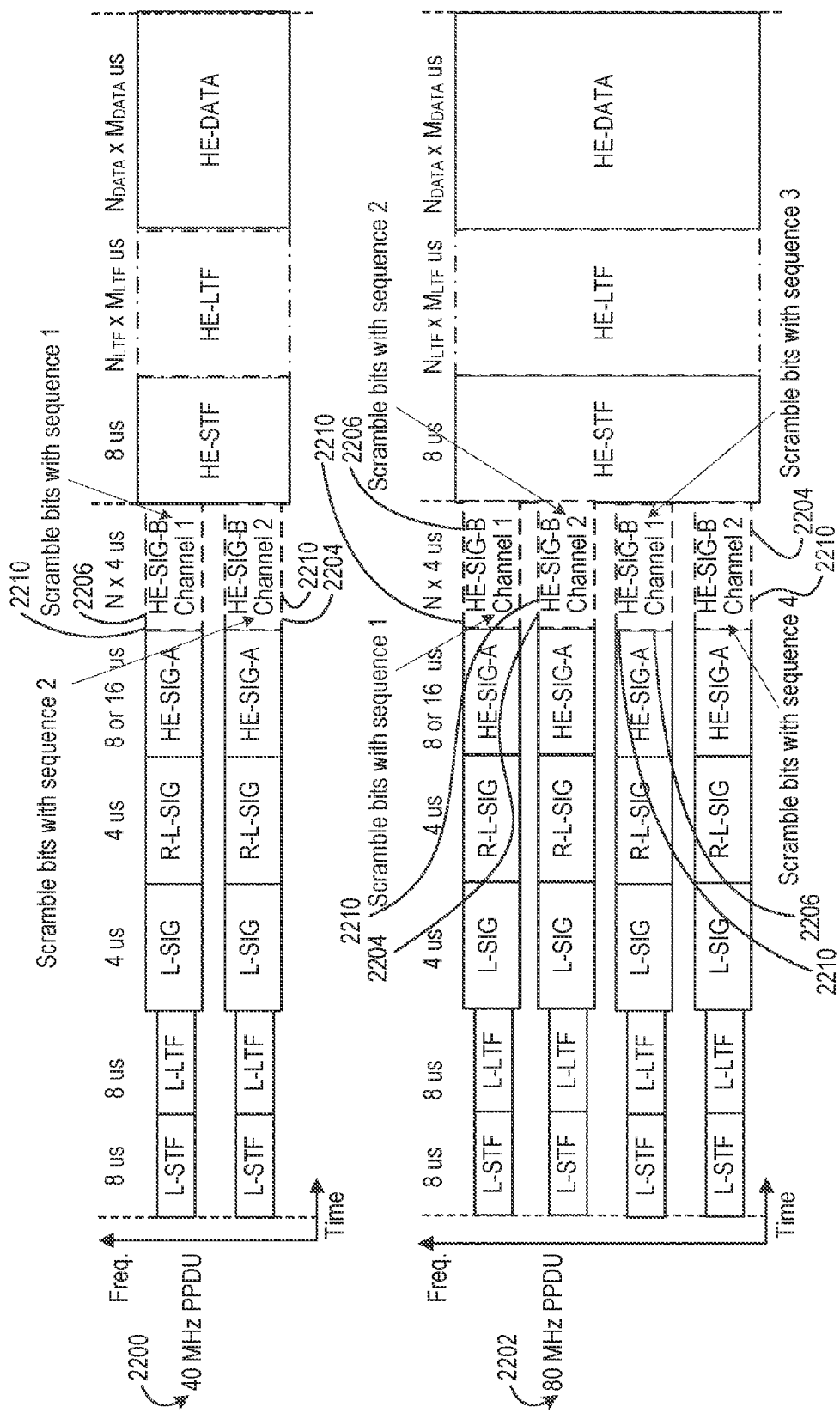
FIG. 22 illustrates an example of HE SIG-B scrambling for 40 MHz, and 80 MHz data packet transmissions.

In order to provide a further reduction of the PAPR, the contents within each 20 MHz unit of the HE SIG-B may be scrambled (e.g., in addition to the gamma rotation described above which phase rotates the multiple overall 20 MHz units themselves). FIG. 22 shows examples of scrambling within each HE SIG-B field with, for example, scrambling sequences referred to as sequence 1, 2, 3, and 4.

Scrambling sequences 1 and 2, when applied respectively to scramble the information within HE SIG-B "channel 1" 2206 and HE SIG-B "channel 2" 2210 may help further reduce the PAPR of transmissions in 40 MHz, 80 MHz, or 160 MHz transmissions. For example, in the 40 MHz transmission case 2200, scrambling sequence 1 may be an all zero sequence (e.g., no scrambling) and scrambling sequence 2 may be a pseudo-random binary sequence. In this example, HE SIG-B channel 1 and channel 2 are ensured to carry different bit sequences even if the information content within each of channels 1 and 2 is same or similar. In the 80 MHz transmission case 2202, in one example, the four 20 MHz units 2210 (e.g., the two copies each HE SIG-B channels 2204 and 2206 corresponding to 20 MHz Channels 2 and 4 and 1 and 3 respectively) of the HE SIG-B may be scrambled using four different scrambling sequences. Alternatively, the scrambling sequences applied to HE SIG-B channels with repeated information (e.g. scrambling sequences 1 and 3 for HE SIG-B Channel 1 and scrambling sequences 2 and 4 for HE SIG-B Channel 2 of FIG. 22) may be different although scrambling sequences 1 and 2 may be identical, and sequences 3 and 4 may be identical. All zero sequences (e.g., no scrambling) may be used for one or more of scrambling sequences 1, 2, 3, or 4 in some implementations.

Various examples of scrambling sequences for scrambling the content within each HE SIG-B field will now be discussed. In some scenarios, the scrambling sequence may be shorter than the bit sequence to be scrambled. In such scenarios, the scrambling sequence may be cyclically applied (e.g. in a round robin manner). For example, if the scrambling sequence has a length of 12 bits and the information bit sequence to be scrambled has a length of 15 bits, the first 12 bits of the information bit sequence may be scrambled with the scrambling sequence and bits 13 to 15 of the information bit sequence may be scrambled with scrambling sequence bits 1, 2, and 3.

In one suitable implementation, a scrambling sequence that may be used for method 1, 2, or 3 is given by S0=[1 0 0 0 1 0 1 0 1 1 1].

In other implementations, scrambling sequences that may be used for method 2 include:
S1=[1 1 1 1 0 1 0 0 1 1 0 0];
S2=[1 1 0 0 1 0 1 0 0 0 0 0];
S3=[1 0 0 0 1 0 1 1 0 1 1 1];
S4=[0 0 1 0 1 1 0 1 1 1 1 0];
S5=[1 1 1 0 0 1 1 0 0 1 0 1];
S6=[1 0 1 1 0 1 1 0 0 0 1 1 1];
S7=[1 0 1 1 0 0 1 1 1 1 0 1 0];
S8=[1 0 1 1 0 1 1 0 0 0 1 1 1];
S9=[1 0 1 1 1 1 1 0 0 0 1 1 0]; and
S10=[0 1 0 1 0 0 1 1 1 1 1 0 1].

Table 3 below provides example PAPR values that may result from using the above scrambling sequences S1-S10 for an information bit sequence with all zero bit values.

TABLE 3

HE SIG-B PAPR of Seq#1 with all zero information bits in [dB]

| Seq# | MCS 0 | MCS 1 | MCS 2 | MCS 3 | MCS 4 |
|---|---|---|---|---|---|
| S1 | 6.73548064949811 | 8.50099677405576 | 8.50099677405576 | 7.95328165903916 | 7.95328165903916 |
| S2 | 7.56891052715065 | 8.47141853181577 | 8.47141853181577 | 8.16581328488694 | 8.16581328488694 |
| S3 | 7.33546088620728 | 8.49881245058410 | 8.49881245058410 | 8.18512977992811 | 8.18512977992811 |
| S4 | 7.86909948078805 | 8.38326695907106 | 8.38326695907106 | 8.46485318000468 | 8.46485318000468 |
| S5 | 7.20625181409844 | 7.72895935352299 | 7.72895935352299 | 8.65792858623831 | 8.65792858623831 |
| S6 | 6.15104019521574 | 6.72733804223857 | 6.72733804223857 | 6.71502394901629 | 6.71502394901629 |
| S7 | 6.80524746147165 | 6.78744562001615 | 6.78744562001615 | 6.55840842760863 | 6.55840842760863 |
| S8 | 6.15104019521574 | 6.72733804223857 | 6.72733804223857 | 6.71502394901629 | 6.71502394901629 |
| S9 | 6.98797014562350 | 6.91797557640716 | 6.91797557640716 | 6.81803636560917 | 6.81803636560917 |
| S10 | 6.99479681722212 | 7.14969715311878 | 7.14969715311878 | 6.95034716120637 | 6.95034716120637 |

| Seq# | MCS 5 | MCS 6 |
|---|---|---|
| S1 | 8.79899837459666 | 8.79899837459666 |
| S2 | 8.45222023260986 | 8.45222023260986 |
| S3 | 7.77039323156964 | 7.77039323156964 |
| S4 | 8.56395757208803 | 8.56395757208803 |
| S5 | 7.97297928466582 | 7.97297928466582 |
| S6 | 6.95434755115716 | 6.95434755115716 |
| S7 | 6.68404987824123 | 6.68404987824123 |
| S8 | 6.95434755115716 | 6.95434755115716 |
| S9 | 7.14226726771337 | 7.14226726771337 |
| S10 | 7.08016508178627 | 7.08016508178627 |

In other implementations, scrambling sequences that may be used for method 3 include:
S11=[1 1 1 1 1 1 0 0 1 1 1 0];
S12=[0 1 0 0 1 1 1 0 1 1 1 1];
S13=[0 1 1 1 1 1 0 1 1 0 0 0];
S14=[0 0 0 1 0 0 0 1 1 0 0 0];
S15=[0 1 1 1 1 1 0 1 1 0 0 1];
S16=[0 1 0 0 0 1 0 1 1 1 0 0 1];
S17=[0 1 1 1 1 1 0 1 0 1 1 0 0];
S18=[0 1 0 1 0 0 1 1 0 0 0 0 0];
S19=[1 1 1 1 1 0 1 0 1 1 0 0 0]; and
S20=[1 1 1 1 1 0 1 1 1 0 0 1 0].

Table 4 below provides example PAPR values that may result from using the above scrambling sequences S11-S20 for an information bit sequence with all zero bit values.

TABLE 4

HE SIG-B PAPR of Seq#1 with all zero information bits in [dB]

| Seq# | MCS 0 | MCS 1 | MCS 2 | MCS 3 |
|---|---|---|---|---|
| S11 | 6.49818754838519 | 11.6599092510977 | 11.6599092510977 | 12.8795156979134 |
| S12 | 11.6564437264857 | 11.3715302944316 | 11.3715302944316 | 11.7864065969716 |
| S13 | 9.63051757348030 | 11.5099852294646 | 11.5099852294646 | 11.7817761959494 |
| S14 | 9.45589120389021 | 11.2441908457945 | 11.2441908457945 | 11.7252744996173 |
| S15 | 8.30905390520151 | 11.0229242502030 | 11.0229242502030 | 11.8996160402143 |
| S16 | 5.92140219823613 | 10.1825851712656 | 10.1825851712656 | 9.91951884754129 |
| S17 | 8.22504546299446 | 7.97435753131781 | 7.97435753131781 | 8.23510437349934 |
| S18 | 7.55982919060399 | 7.91149578041348 | 7.91149578041348 | 8.65414653417065 |
| S19 | 8.86945996037098 | 8.15622537994608 | 8.15622537994608 | 8.99127859811263 |
| S20 | 9.06397623582130 | 9.00167629635931 | 9.00167629635931 | 8.80077975122220 |

TABLE 4-continued

HE SIG-B PAPR of Seq#1 with all zero information bits in [dB]

| Seq# | MCS 4 | MCS 5 | MCS 6 |
|---|---|---|---|
| S11 | 12.8795156979285 | 12.1304660522285 | 12.1304660522285 |
| S12 | 11.7864065969716 | 11.4244928834831 | 11.4244928834831 |
| 513 | 11.7817761959494 | 11.8087929092386 | 11.8087929092386 |
| S14 | 11.7252744996173 | 11.8378074926243 | 11.8378074926243 |
| S15 | 11.8996160402143 | 11.9020360188488 | 11.9020360188488 |
| S16 | 9.91951884754129 | 9.35491419752016 | 9.35491419752016 |
| S17 | 8.23510437349934 | 7.88570674133390 | 7.88570674133390 |
| S18 | 8.65414653417065 | 8.76499562993595 | 8.76499562993595 |
| S19 | 8.99127859811263 | 9.00013057607110 | 9.00013057607110 |
| S20 | 8.80077975122220 | 9.11603893867286 | 9.11603893867286 |

As shown, for short scrambling sequences, method 2 may outperform method 3 in terms of PAPR.

In other implementations, an m-sequence with a generator polynomial of $S(x)=x^7+x^4+1$ may be used for scrambling in any or all of methods 1, 2, and 3. In these implementations, different scrambling sequences for each 20 MHz unit of the HE SIG-B may use different initial seed values for the generator polynomial. For example, the initial seed value may be dependent on parameters signaled in the HE SIG-A field. One example of the parameter that may be used for the initial seed value is the BSS Color Field.

In the methods described above (with the exception, for example, of method 1), the received HE SIG-B signal for 80 MHz can be combined to improve decoding performance. The combining of the modulated symbols or received LLRs can occur after scrambling has been removed. This allows additional 3 dB in receive signal combining gain for 80 MHz HE SIG-B reception.

Figure 23:
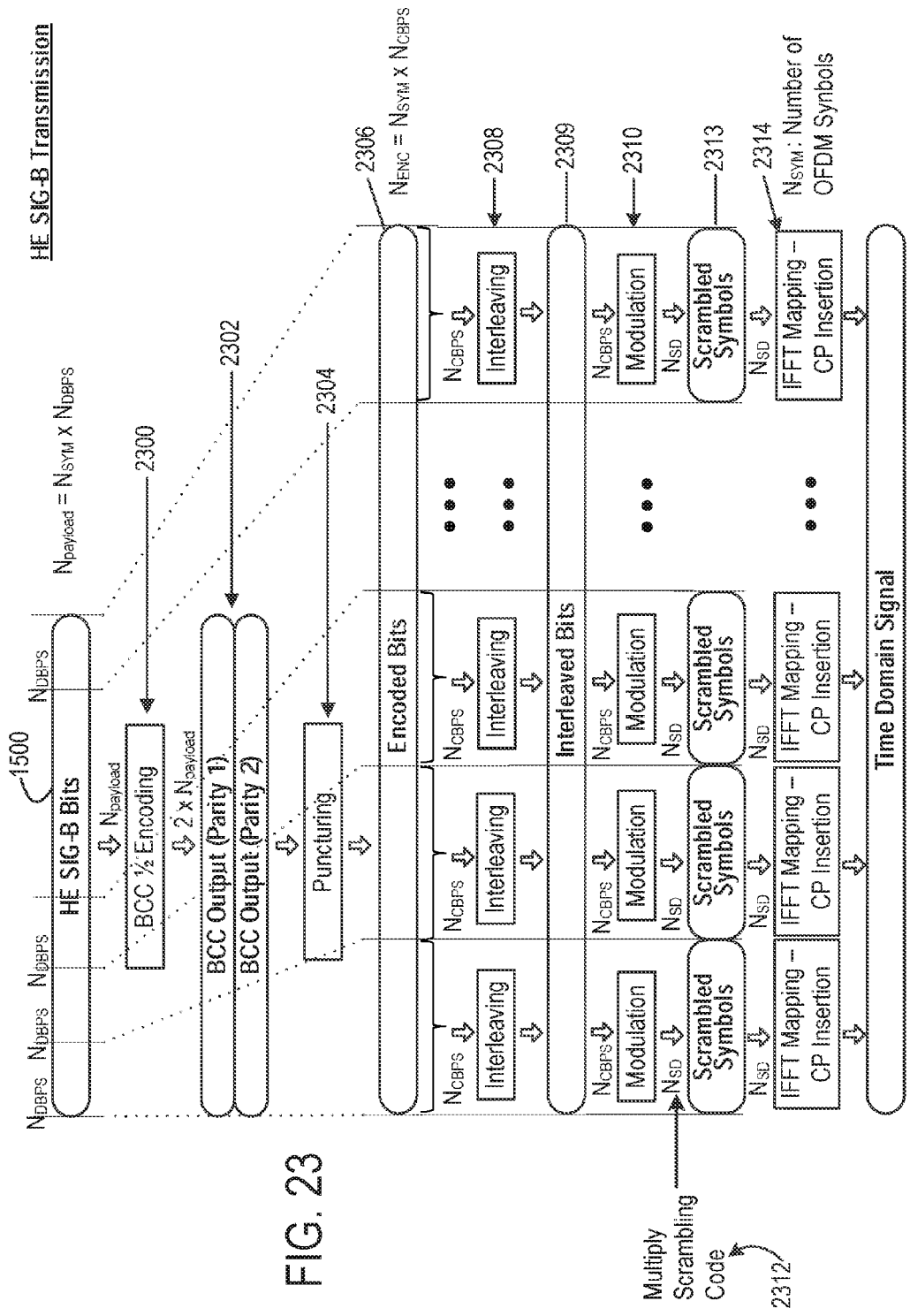
FIG. 23 illustrates an example of a signal processing flow including a scrambling operation within an HE SIG-B field that is performed after modulation.
Figure 24:
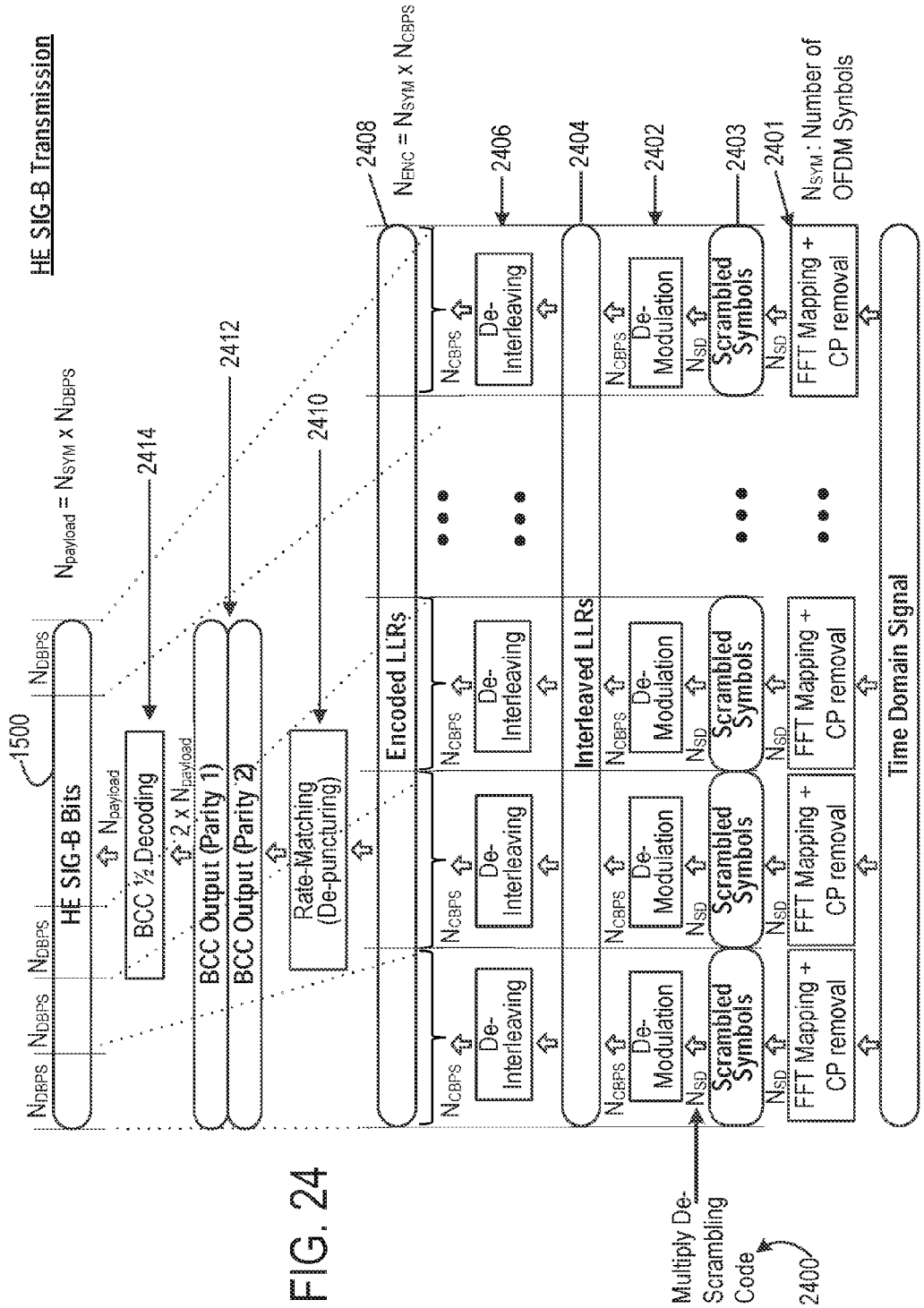
FIG. 24 illustrates an example of a signal reception flow including a de-scrambling operation within an HE SIG-B field that is performed before de-modulation.

Although the methods described above include bit level scrambling of the HE SIG-B information bits, this is merely illustrative. In other implementations, modulated symbols of the HE SIG-B field may be scrambled differently for different frequency bands (e.g., after modulation operations such as BPSK, QPSK, 16-QAM, 64-QAM or other modulation operations). For convenience, these operations in which modulated symbols of the HE SIG-B field may be scrambled differently for different frequency bands may be referred to as method 4. In various implementations, the modulated symbol level scrambling can be done in units of 20 MHz or smaller. FIGS. 23 and 24 illustrate transmission and reception signal flows in accordance with various aspects of method 4, respectively. The scrambling of the modulated symbols described herein (e.g., in connection with FIGS. 23 and 24) may be applied on top of the gamma rotation (i.e. the gamma rotation, using $\gamma_{k,BW}$, described above which may be performed on entire 20 MHz channel units in 40/80/160 MHz transmissions).

FIG. 23 shows an example of the signal processing flow of HE SIG-B (e.g., by a transmitter device at an AP or a transmitter device at a STA) in accordance with various aspects of method 4. In one or more aspects, as each of an AP and a STA contains a transmitter device, each of an AP and a STA may be also referred to as a transmitter device. In particular, FIG. 23 shows an example of the signal processing flow for one 20 MHz HE-SIG-B unit, even if the number of 20 MHz HE-SIG-B units is greater than one (e.g., in cases in which the HE-SIG-B field of the 20 MHz HE PPDU has one 20 MHz HE-SIG-B unit, the HE-SIG-B field of a 40 MHz HE PPDU has two 20 MHz HE-SIG-B units, and/or the HE-SIG-B field of a 80 MHz HE PPDU has four 20 MHz HE-SIG-B units). As shown in FIG. 23, $N_{DBPS}$ HE-SIG-B bits of the HE SIG-B payload bits 1500 (e.g., $N_{payload}$ bits) may be encoded 2300 (e.g., using a 1/2 code rate BCC encoder) to form $2 \times N_{DBPS}$ BCC-encoded bits 2302. The $N_{DBPS}$ represents the number of data bits per OFDM symbol. The $2 \times N_{DBPS}$ BCC-Encoded bits 2302 may be rate-matched 2304 (e.g., some bits may be punctured) to meet a target code rate, R (e.g., either 1/2, 2/3, 3/4, or 5/6) to form $N_{CBPS}$ rate-matched encoded bits 2306 (simply referred to as coded bits or coded HE-SIG-B bits). The $N_{CBPS}$ represents the number of coded bits per OFDM symbol. Next, the $N_{CBPS}$ coded bits 2306 may be interleaved 2308 to form $N_{CBPS}$ interleaved coded bits of entire interleaved bits 2309. Each set of the $N_{CBPS}$ bits of the entire interleaved bits 2309 may be modulated 2310 (e.g., using a BPSK, QPSK, 16-QAM, 64-QAM or other modulation operation) to form $N_{SD}$ modulated symbols or data tones. $N_{SD}$ represents the number of data subcarriers, and can be equal to 52. $N_{SD}$ modulated symbols or data tones may be generated by modulation 2310, which may be multiplied 2312 by a scrambling code (e.g., a $1^{st}$ phase rotation pattern including a complex valued sequence including $N_{SD}$ complex values that effectively performs a phase rotation for the modulated symbols) to form scrambled symbols 2313, which may be referred to as phase-rotated symbols. At least two complex values in the $1^{st}$ phase rotation pattern need to be different for effectively scrambling the $N_{SD}$ modulated symbols, which means that each of the $N_{SD}$ complex values are selected from two or more different values. If all complex values in the $1^{st}$ phase rotation pattern are equal, the $N_{SD}$ complex values are not scrambled at all. The $1^{st}$ phase rotation pattern can reduce PAPR of the HE-SIG-B field resulting from many identical or similar subfields or many zero values in the HE SIG-B field within a 20 MHz channel. Scrambled (phase rotated) symbols 2313 may be mapped (or transformed using, e.g., IFFT or IDFT) 2314 to $N_{SD}$ subcarriers (in frequency) of each OFDM symbol. A different scrambling code or the same scrambling code can be multiplied to the modulated symbols generated within each of the 20 MHz HE SIG-B units. An additional, $2^{nd}$ phase rotation pattern, referred to as a gamma rotation, can be applied to the $N_{SD}$ modulated symbols, along with the $1^{st}$ scrambling/phase rotation pattern. The $2^{nd}$ phase rotation pattern can reduce the PAPR of the HE-SIG-B field resulting from many identical or similar subfields or repeated bit patterns in the HE SIG-B field between at least two 20 MHz HE SIG-B units.

Table 5 shows an example of the $1^{st}$ phase rotation pattern and the $2^{nd}$ phase rotation pattern for the HE-SIG-B field of a 20 MHz PPDU.

TABLE 5

| HE-SIG-B unit | 1st phase rotation pattern | 2nd phase rotation pattern |
|---|---|---|
| 1st HE-SIG-B unit | 1st scrambling sequence for 20 MHz PPDU | +1 |

As shown in Table 5, the HE-SIG-B field of a 20 MHz HE PPDU has one 20 MHz HE-SIG-B unit.

A set of $N_{SD}$ phase rotation values for the $1^{st}$ phase rotation pattern corresponding to the $1^{st}$ HE-SIG-B unit are multiplied to the $N_{SD}$ modulated symbols for the $1^{st}$ SIG-B unit, respectively. Also, a set of $N_{SD}$ phase rotation values for the $2^{nd}$ phase rotation pattern corresponding to the $1^{st}$ HE-SIG-B unit are multiplied to the $N_{SD}$ modulated symbols for the $1^{st}$ SIG-B unit, respectively. The set of $N_{SD}$ phase rotation values for the $1^{st}$ phase rotation pattern can be called the scrambling sequence. The set of $N_{SD}$ phase rotation values for the $1^{st}$ phase rotation pattern corresponding to the $1^{st}$ HE-SIG-B unit is different from the $2^{nd}$ phase rotation pattern corresponding to the $1^{st}$ HE-SIG-B unit. All $N_{SD}$ phase rotation values for the $2^{nd}$ phase rotation pattern corresponding to the $1^{st}$ HE-SIG-B unit are equal to +1. At least two phase rotation values in the $1^{st}$ phase rotation pattern corresponding to the $1^{st}$ HE-SIG-B unit are different.

Table 6 shows an example of the $1^{st}$ phase rotation pattern and the $2^{nd}$ phase rotation pattern for the HE-SIG-B field of a 40 MHz PPDU.

TABLE 6

| HE-SIG-B unit | 1st phase rotation pattern | 2nd phase rotation pattern |
|---|---|---|
| 1st HE-SIG-B unit corresponding to lower 20 MHz | 1st scrambling sequence for 40 MHz PPDU | +1 |
| 2nd HE-SIG-B unit corresponding to higher 20 MHz | 2nd scrambling sequence for 40 MHz PPDU | +j |

As shown in Table 6, the HE-SIG-B field of a 40 MHz HE PPDU has two 20 MHz HE-SIG-B units.

A set of $N_{SD}$ phase rotation values for the $1^{st}$ phase rotation pattern and a set of $N_{SD}$ phase rotation values for the $2^{nd}$ phase rotation pattern corresponding to each SIG-B unit are applied to the $N_{SD}$ modulated symbols for each SIG-B unit. The set of $N_{SD}$ phase rotation values for the $1^{st}$ phase rotation pattern can be called the scrambling sequence.

For example, a set of $N_{SD}$ phase rotation values for the $1^{st}$ phase rotation pattern (e.g., a $1^{st}$ scrambling sequence) corresponding to the $1^{st}$ HE-SIG-B unit are multiplied to the $N_{SD}$ modulated symbols for the $1^{st}$ SIG-B unit, respectively. Also, a set of $N_{SD}$ phase rotation values for the $2^{nd}$ phase rotation pattern corresponding to the $1^{st}$ HE-SIG-B unit are multiplied to the $N_{SD}$ modulated symbols for the $1^{st}$ SIG-B unit, respectively. The set of $N_{SD}$ phase rotation values for the $1^{st}$ phase rotation pattern (e.g., the $1^{st}$ scrambling sequence) corresponding to the $1^{st}$ HE-SIG-B unit is different from the $2^{nd}$ phase rotation pattern corresponding to the $1^{st}$ HE-SIG-B unit. All $N_{SD}$ phase rotation values for the $2^{nd}$ phase rotation pattern corresponding to the $1^{st}$ HE-SIG-B unit are equal to +1. At least two phase rotation values in the $1^{st}$ phase rotation pattern (e.g., the $1^{st}$ scrambling sequence) corresponding to the $1^{st}$ HE-SIG-B unit are different.

A set of $N_{SD}$ phase rotation values for the $1^{st}$ phase rotation pattern (e.g., a $2^{nd}$ scrambling sequence) corresponding to the $2^{nd}$ HE-SIG-B unit are multiplied to the $N_{SD}$ modulated symbols for the $2^{nd}$ SIG-B unit, respectively. At least two phase rotation values in the $1^{st}$ phase rotation pattern (e.g., the $2^{nd}$ scrambling sequence) corresponding to the $2^{nd}$ HE-SIG-B unit are different. All $N_{SD}$ phase rotation values for the $2^{nd}$ phase rotation pattern corresponding to the $2^{nd}$ HE-SIG-B unit are equal to +j. In an embodiment, the $1^{st}$ scrambling sequence can be the same as the $2^{nd}$ scrambling sequence. In an embodiment, the $1^{st}$ scrambling sequence can be different from the $2^{nd}$ scrambling sequence.

Table 7 shows an example of the $1^{st}$ phase rotation pattern and the $2^{nd}$ phase rotation pattern for the HE-SIG-B field of a 80 MHz PPDU.

TABLE 7

| HE-SIG-B unit | 1st phase rotation pattern | 2nd phase rotation pattern |
|---|---|---|
| 1st HE-SIG-B unit corresponding to the lowest 20 MHz | 1st scrambling sequence for 80 MHz PPDU | +1 |
| 2nd HE-SIG-B unit corresponding to the second lowest 20 MHz | 2nd scrambling sequence for 80 MHz PPDU | −1 |
| 3rd HE-SIG-B unit corresponding to the third lowest 20 MHz | 3rd scrambling sequence for 80 MHz PPDU | −1 |
| 4th HE-SIG-B unit corresponding to the highest 20 MHz | 4th scrambling sequence for 80 MHz PPDU | −1 |

As shown in Table 7, the HE-SIG-B field of a 80 MHz HE PPDU has four 20 MHz HE-SIG-B units.

A set of $N_{SD}$ phase rotation values for the $1^{st}$ phase rotation pattern and a set of $N_{SD}$ phase rotation values for the $2^{nd}$ phase rotation pattern corresponding to each SIG-B unit are applied to the $N_{SD}$ modulated symbols for each SIG-B unit. The set of $N_{SD}$ phase rotation values for the $1^{st}$ phase rotation pattern can be called the scrambling sequence.

For example, a set of $N_{SD}$ phase rotation values for the $1^{st}$ phase rotation pattern (e.g., a first scrambling sequence) corresponding to the $1^{st}$ HE-SIG-B unit are multiplied to the $N_{SD}$ modulated symbols for the $1^{st}$ SIG-B unit, respectively. Also, a set of $N_{SD}$ phase rotation values for the $2^{nd}$ phase rotation pattern corresponding to the $1^{st}$ HE-SIG-B unit are multiplied to the $N_{SD}$ modulated symbols for the $1^{st}$ SIG-B unit, respectively. The set of $N_{SD}$ phase rotation values for the $1^{st}$ phase rotation pattern (e.g., the first scrambling sequence) corresponding to the $1^{st}$ HE-SIG-B unit is different from the $2^{nd}$ phase rotation pattern corresponding to the $1^{st}$ HE-SIG-B unit. All $N_{SD}$ phase rotation values for the $2^{nd}$ phase rotation pattern corresponding to the $1^{st}$ HE-SIG-B unit are equal to +1. At least two phase rotation values in the $1^{st}$ phase rotation pattern (e.g., the first scrambling sequence) corresponding to the $1^{st}$ HE-SIG-B unit are different.

All $N_{SD}$ phase rotation values for the $2^{nd}$ phase rotation pattern corresponding to the $2^{nd}$ HE-SIG-B unit are equal to −1. All $N_{SD}$ phase rotation values for the $2^{nd}$ phase rotation pattern corresponding to the $3^{rd}$ HE-SIG-B unit are equal to −1. All $N_{SD}$ phase rotation values for the $2^{nd}$ phase rotation pattern corresponding to the $4^{th}$ HE-SIG-B unit are equal to −1. In an embodiment, all four scrambling sequences can be the same. In an embodiment, at least two scrambling sequences of the four scrambling sequences can be different.

Referring to FIGS. 3A and 23, the encoder 281 of FIG. 3A may perform an encoding operation 2300 of FIG. 23. A rate-mating operation 2304 may be performed by a rate-mating module (not shown in FIG. 3A). The interleaver 282 of FIG. 3A may perform an interleaving operation 2308 of FIG. 23. The mapper 283 of FIG. 3A may perform a modulation operation 2310. The mapper 283 may be referred to as a constellation mapper, and the modulation operation 2310 may comprise constellation mapping. The scrambling operation to produce scrambled symbols 2313 may be performed by a scrambler (not shown in FIG. 3A). The IFT 284 of FIG. 3A may perform an IFFT mapping operation of the process 2314. The GI inserter 285 may perform a cyclic prefix (CP) insertion operation of the process 2314.

FIG. 24 shows an example of the signal reception flow of HE SIG-B (e.g., by a receiving device at a STA or a receiving device at an AP) in accordance with various aspects of method 4. In one or more aspects, as each of an AP and a STA contains a receiving device, each of an AP and a STA may be also referred to as a receiving device. As shown in FIG. 24, $N_{SD}$ modulated symbols (in frequency domain) of each OFDM symbol may be demapped (or transformed using, e.g., FFT or DFT) 2401 and de-scrambled 2400. De-scrambling 2400 may include phase de-rotating the $N_{SD}$ demapped symbols (data tones), which are scrambled symbols 2403), by multiplying the $N_{SD}$ demapped symbols resulting from demapping 2401 by a corresponding plurality of $N_{SD}$ phase de-rotation values of a $1^{st}$ phase de-rotation pattern. Next, the $N_{SD}$ de-scrambled modulated symbols of each OFDM symbol may be demodulated 2402 into $N_{CBPS}$ interleaved log likelihood ratio (LLR) values 2404. The LLRs 2404 may be de-interleaved 2406. The de-interleaved bit sequences 2408 may be rate-matched 2410 (e.g., de-punctured) to the original 1/2 rate encoding state 2412. For example, missing (e.g., punctured out) bit positions may be set to zero LLR values and decoded 2414 to obtain the final HE SIG-B bit sequence which may be identical to the original HE SIG-B bit sequence 1500. An additional, $2^{nd}$ phase de-rotation pattern, referred to as a gamma de-rotation, can be applied to $N_{SD}$ demapped symbols along with the $1^{st}$ phase de-rotation pattern. The gamma de-rotation may include multiplying a complex conjugate of a gamma value to the different frequency channel (e.g., the 20 MHz frequency channel) of the HE SIG-B field.

Referring to FIGS. 3B and 24, the GI remover 291 of FIG. 3B may perform a CP removal operation of the process 2401 of FIG. 24, and the FT 292 of FIG. 3B may perform a FFT mapping operation portion of the process 2401 of FIG. 24. A de-scrambling operation on the scrambled symbols 2400 may be performed by a de-scrambler (not shown in FIG. 3B). The demapper 293 of FIG. 3B may perform a demodulation operation 2402. The demapper 293 may be referred to as a constellation demapper, and the demodulation operation 2402 comprises constellation demapping. The deinterleaver 294 of FIG. 3B may perform a de-interleaving operation 2406 of FIG. 24. A rate-matching operation 2410 may be performed by a rate-matching module (not shown in FIG. 3B). The decoder 295 of FIG. 3B may perform a decoding operation 2414 of FIG. 24.

In one or more implementations, as each of an AP and a STA may include a transmitter device and a receiving device (e.g., performing the operations described in FIGS. 23 and 24), each of an AP and a STA may be referred to as a transceiver device.

Figure 25:
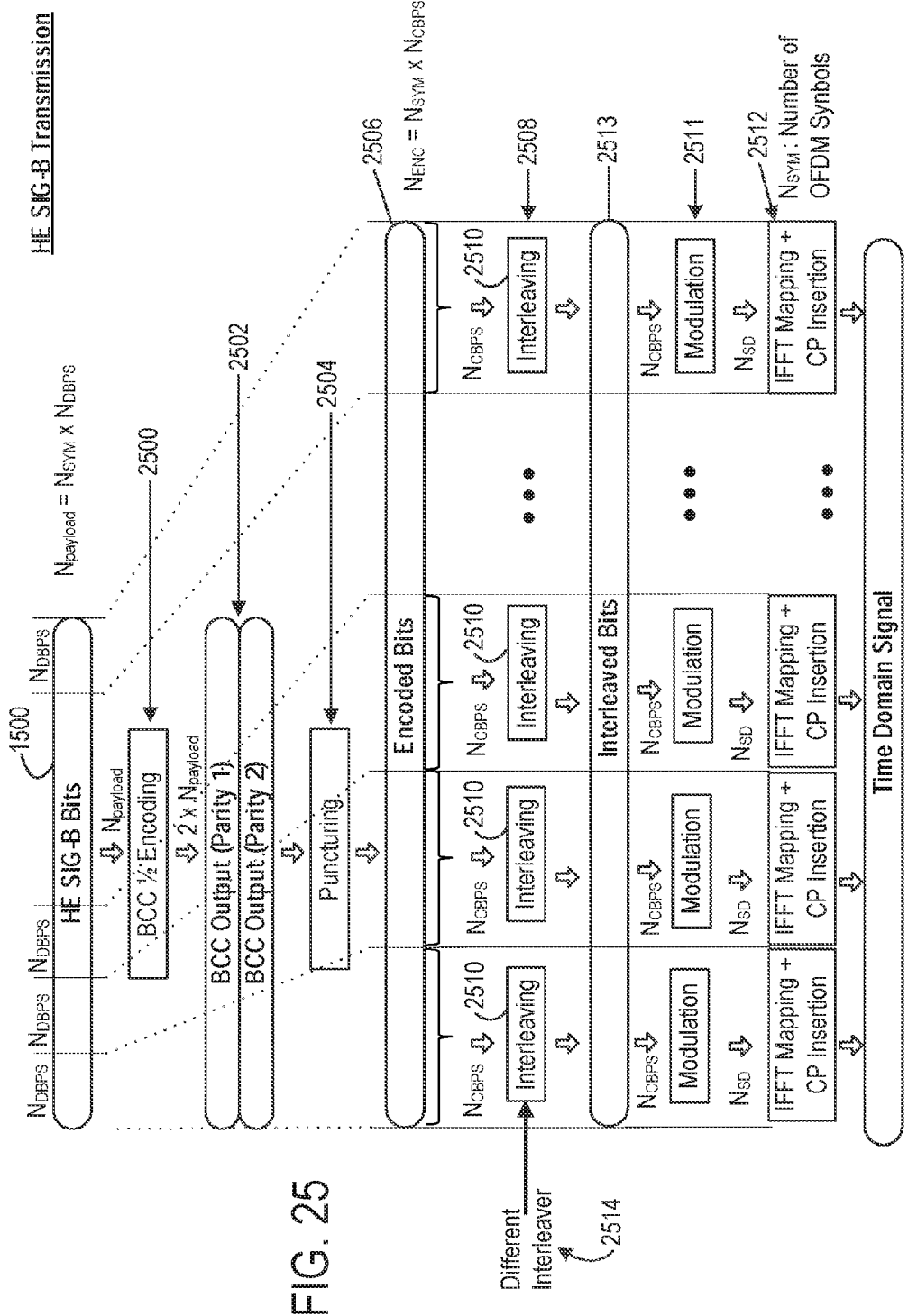
FIG. 25 illustrates an example of a signal processing flow including interleaving using a different interleaver for different frequency channels of HE SIG-B fields.
Figure 26:
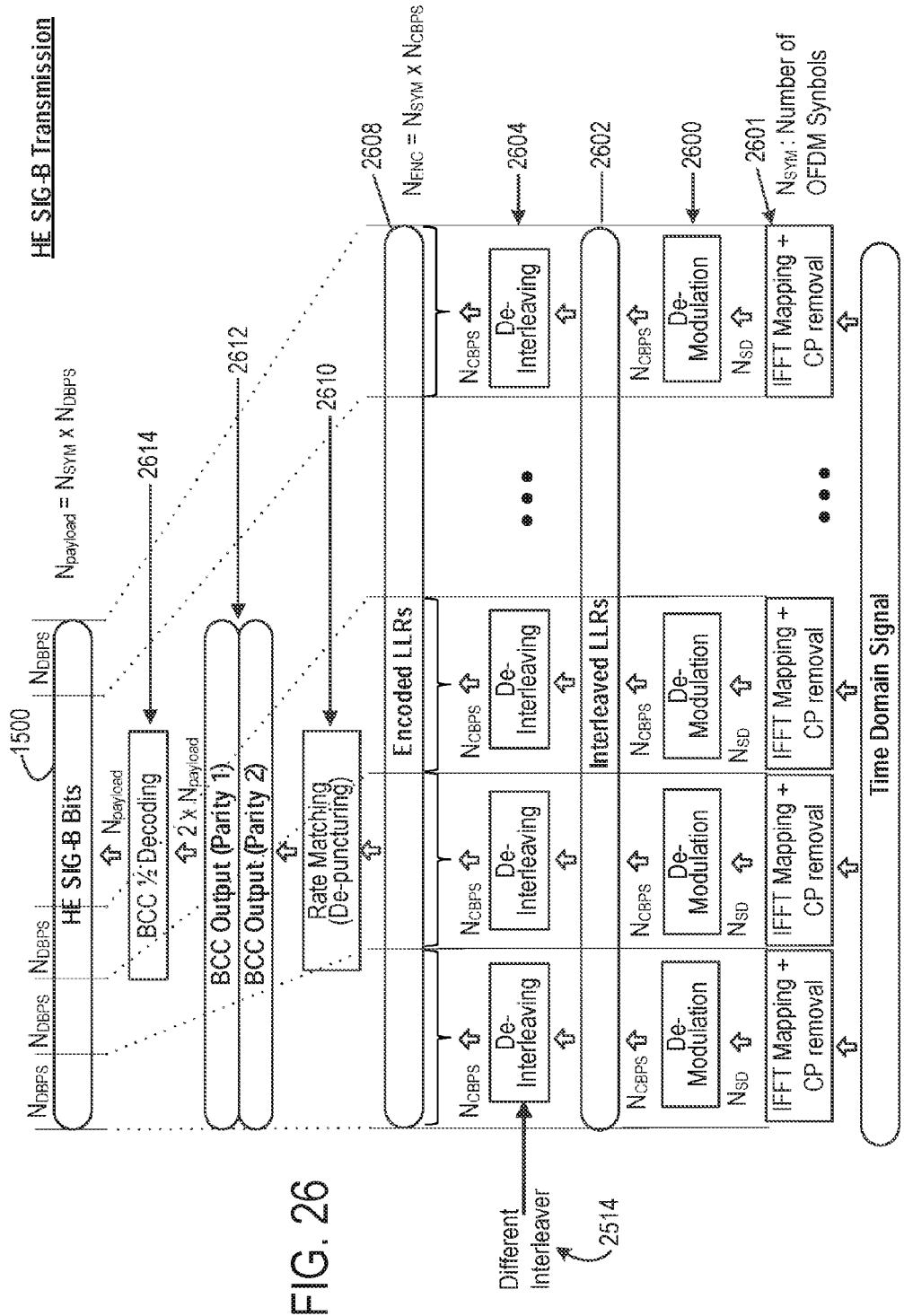
FIG. 26 illustrates an example of a signal reception flow including dc-interleaving using a different interleaver for different frequency channels of HE SIG-B fields.

In yet other implementations, it may be also possible to use different interleavers for different 20 MHz units of HE SIG-B to reduce the PAPR of a transmission. For convenience, use of different interleavers for different 20 MHz units of HE SIG-B to reduce the PAPR of a transmission may be referred to as method 5. FIGS. 25 and 26 illustrate transmission and reception signal flows for method 5, respectively.

FIG. 25 shows an example of the signal processing flow of HE SIG-B in accordance with various aspects of method 5. As shown in FIG. 25, the HE SIG-B payload bits 1500 (e.g., $N_{payload}$ bits) may be encoded 2500 (e.g., using a 1/2 code rate BCC encoder). Encoded bits 2502 resulting from the encoding 2500 may be rate-matched 2504 (e.g., some bits punctured) to meet a target code rate, R (e.g., either 1/2, 2/3, 3/4, or 5/6). Next, encoded, rate-matched signal bits 2506 may be interleaved 2508 (e.g., in units of $N_{CBPS}$). As indicated in FIG. 25, one or more different interleavers 2514 may be used for interleaving 2508. For example, each $N_{CBPS}$ bits may be interleaved in an individualized interleaving operation 2510 using a different interleaver to form interleaved bits 2513. Each $N_{CBPS}$ bits of interleaved bits 2513 may then be modulated 2511. The $N_{SD}$ modulated symbols are mapped 2512 (e.g., using IFFT mapping and CP insertion) to $N_{SD}$ subcarriers (in frequency) of each OFDM symbol. In one implementation, the interleaver used for different 20 MHz units of HE SIG-B might be different. For example, in 80 MHz transmission there are two 20 MHz units of HE SIG-B channel 1 and two 20 MHz unit of HE SIG-B channel 2. Each of the 20 MHz units of HE SIG-B may utilize a different interleaver.

It should be noted that, in some scenarios, no-interleaving (i.e. not performing interleaving) can be considered as a different interleaving.

FIG. 26 shows an example of the signal reception flow of HE SIG-B in accordance with various aspects of method 5. As shown in FIG. 26, $N_{SD}$ modulated symbols (in frequency domain) of each OFDM symbol may be demapped 2601 and demodulated 2600 into $N_{CBPS}$ interleaved log likelihood ratio (LLR) values 2602. The LLRs 2602 may be de-interleaved 2604. De-interleaving 2604 may be based on the different interleavers 2514 used for each 20 MHz unit of HE SIG-B. The de-interleaved bit sequence 2608 resulting from de-interleaving 2604 may be rate-matched 2610 to the original 1/2 rate encoding state 2612. For example, missing (e.g., punctured out) bit positions may be set to zero LLR values and decoded 2614 to obtain the final HE SIG-B bit sequence which may be identical to the original HE SIG-B bit sequence 1500.

The various systems and methods described herein can be applied to lower the PAPR of SIG-B symbols of an HE PPDU.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 27A:
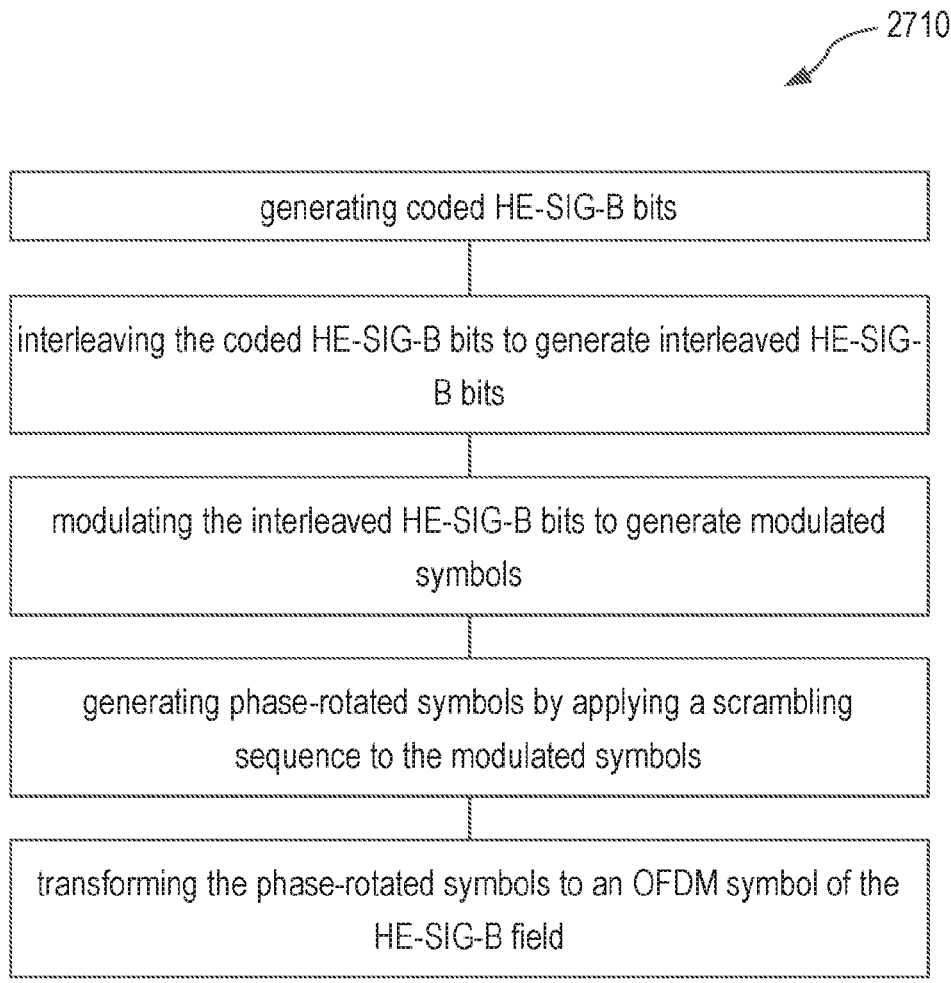
FIGS. 27A, 27B, and 27C illustrate flow charts of examples of methods for facilitating wireless communication.
Figure 27B:
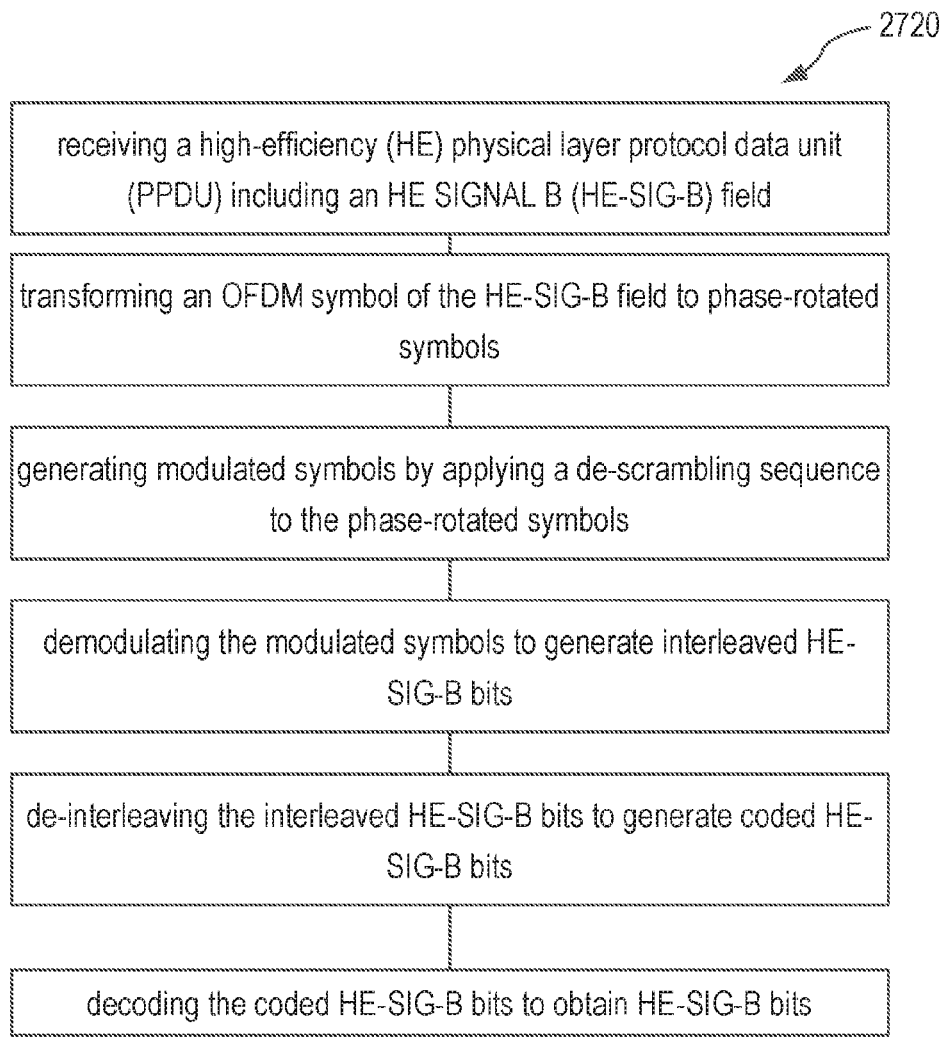
Figure 27C:
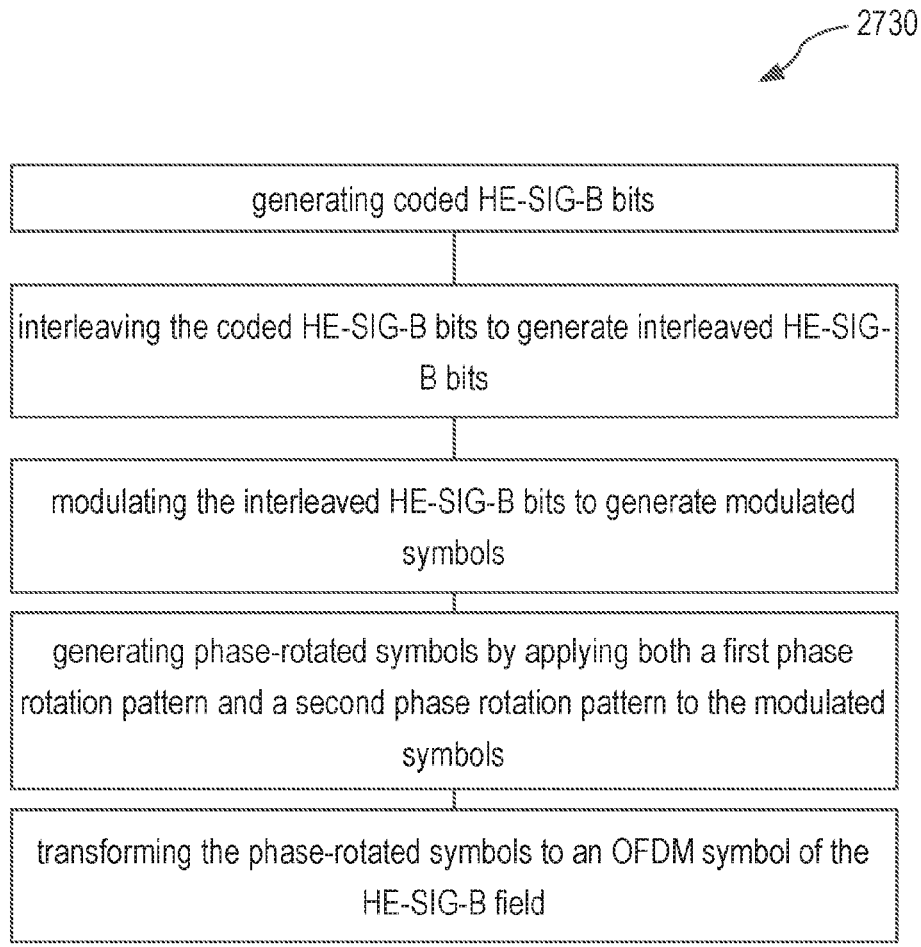

FIGS. 27A, 27B, and 27C illustrate flow charts of examples of methods for facilitating wireless communication. For explanatory and illustration purposes, the example processes 2710, 2720 and 2730 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290, however, the example processes 2710, 2720 and 2730 are not limited to the wireless communication devices 111-115 of FIG. 1 or their components, and the example processes 2710, 2720 and 2730 may be performed by some of the devices shown in FIG. 1, or other devices or components. Further for explanatory and illustration purposes, the blocks of the example processes 2710, 2720 and 2730 are described herein as occurring in serial or linearly. However, multiple blocks of the example processes 2710, 2720, and 2730 may occur in parallel. In addition, the blocks of the example processes 2710, 2720, and 2730 need not be performed in the order shown and/or one or more of the blocks/actions of the example processes 2710, 2720, and 2730 need not be performed.

Various examples of aspects of the disclosure are described below as clauses for convenience. These are provided as examples, and do not limit the subject technology. As an example, some of the clauses described below are illustrated in FIGS. 27A. 27B, and 27C.

Clause A. A wireless device for transmitting a frame, including: one or more memories; and one or more processors coupled to the one or more memories, the one or more processors configured to cause: generating a high-efficiency (HE) physical layer protocol data unit (PPDU) including an HE SIGNAL B (HE-SIG-B) field, wherein the generating includes: generating coded HE-SIG-B bits, interleaving the coded HE-SIG-B bits to generate interleaved HE-SIG-B bits, modulating the interleaved HE-SIG-B bits to generate modulated symbols, generating phase-rotated symbols by applying a scrambling sequence to the modulated symbols, and transforming the phase-rotated symbols to an OFDM symbol of the HE-SIG-B field; and transmitting the HE PPDU.

Clause B. A wireless device for receiving a frame, including: one or more memories; and one or more processors coupled to the one or more memories, the one or more processors configured to cause: receiving a high-efficiency (HE) physical layer protocol data unit (PPDU) including an HE SIGNAL B (HE-SIG-B) field; transforming an OFDM symbol of the HE-SIG-B field to phase-rotated symbols; generating modulated symbols by applying a de-scrambling sequence to the phase-rotated symbols; demodulating the modulated symbols to generate interleaved HE-SIG-B bits; de-interleaving the interleaved HE-SIG-B bits to generate coded HE-SIG-B bits; and decoding the coded HE-SIG-B bits to obtain HE-SIG-B bits.

Clause C. A method for transmitting a frame, the method including: generating a high-efficiency (HE) physical layer protocol data unit (PPDU) including an HE SIGNAL B (HE-SIG-B) field, wherein the generating includes: generating coded HE-SIG-B bits, interleaving the coded HE-SIG-B bits to generate interleaved HE-SIG-B bits, modulating the interleaved HE-SIG-B bits to generate modulated symbols, generating phase-rotated symbols by applying both a first phase rotation pattern and a second phase rotation pattern to the modulated symbols, and transforming the phase-rotated symbols to an OFDM symbol of the HE-SIG-B field; and transmitting the HE PPDU.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A wireless device for transmitting a frame, comprising:
one or more memories; and
one or more processors coupled to the one or more memories, the one or more processors configured to cause:
generating a high-efficiency (HE) physical layer protocol data unit (PPDU) including an HE signal B (HE-SIG-B) field that immediately follows an HE signal A (HE-SIG- A) field and immediately precedes an HE short training field (HE-STF), wherein the generating comprises:
generating coded HE-SIG-B bits, interleaving the coded HE-SIG-B bits to generate interleaved HE-SIG-B bits, modulating the interleaved HE-SIG-B bits to generate N modulated symbols, N being a positive integer, generating N phase-rotated symbols by applying a first set of N phase rotation values to the N modulated symbols respectively, and by applying a second set of N phase rotation values to the N modulated symbols respectively, wherein the second set of N phase rotation values is different from the first set of N phase rotation values, and
transforming the N phase-rotated symbols to an orthogonal frequency-division multiplexing (OFDM) symbol of the HE-SIG-B field; and transmitting the HE PPDU;
wherein the coded HE-SIG-B bits belong to a 20 MHz HE-SIG-B unit of the HE-SIG-B field,
wherein at least two complex values in the first set of N phase rotation values scrambling sequence are different resulting in different phase rotations, and each phase rotation value in the second set of N phase rotation values has the same value corresponding to the 20 MHz HE-SIG-B unit to each of the modulated symbols.

2. The wireless device of claim 1, wherein:
the transmitting comprises transmitting the HE PPDU in 40 MHz, when the 20 MHz HE-SIG-B unit has a first frequency band, the same value is equal to +1, and
when the 20 MHz HE-SIG-B unit has a second frequency band higher than the first frequency band, the same value is equal to +j, wherein j is the imaginary unit which satisfies the equation $j^2=-1$.

3. The wireless device of claim 1, wherein:
the transmitting comprises transmitting the HE PPDU in 80 MHz, when the 20 MHz HE-SIG-B unit has a first frequency band, the same value is equal to +1,
when the 20 MHz HE-SIG-B unit has a second frequency band higher than the first frequency band, the same value is equal to −1,
when the 20 MHz HE-SIG-B unit has a third frequency band higher than the second frequency band, the same value is equal to −1, and
when the 20 MHz HE-SIG-B unit has a fourth frequency band higher than the third frequency band, the same value is equal to −1.

4. The wireless device of claim 1, wherein the first set of N phase rotation values is for reducing peak-to-average power ratio (PAPR) occurring within the 20 MHz HE-SIG-B unit of the HE-SIG-B field, and wherein the second set of N phase rotation values is for reducing PAPR occurring between at least two 20 MHz HE-SIG-B units of the HE-SIG-B field.

5. The wireless device of claim 1, wherein the HE PPDU further comprises i) a non-high throughput (HT) short training field (L-STF), a non-HT long training field (L-LTF), a non-HT signal (L-SIG) field, a repeated L-SIG field, and the HE signal A (HE-SIG-A) field which are followed by the HE-SIG-B field, and ii) the HE-STF, an HE-LTF, and an HE-data field which follow the HE-SIG-B field.

6. The wireless device of claim 1, wherein generating the coded HE-SIG-B bits comprises:
binary convolutional code (BCC) encoding HE-SIG-B bits to generate BCC-encoded HE-SIG-B bits, and
puncturing the BCC-encoded HE-SIG-B bits to generate the coded HE-SIG-B bits.

7. A wireless device for receiving a frame, comprising:
one or more memories; and
one or more processors coupled to the one or more memories, the one or more processors configured to cause:
receiving a high-efficiency (HE) physical layer protocol data unit (PPDU) including an HE signal B (HE-SIG-B) field that immediately follows an HE signal A (HE-SIG-A) field and immediately precedes an HE short training field (HE-STF);
transforming an orthogonal frequency-division multiplexing (OFDM) symbol of the HE-SIG-B field to N phase-rotated symbols, N being a positive integer;
generating N modulated symbols by applying a first set of N phase rotation values to the N phase-rotated symbols respectively, and by applying a second set of N phase rotation values to the N phase-rotated symbols respectively, wherein the second set of N phase rotation values is different from the first set of N phase rotation values;
demodulating the N modulated symbols to generate interleaved HE-SIG-B bits;
de-interleaving the interleaved HE-SIG-B bits to generate coded HE-SIG-B bits;
and decoding the coded HE-SIG-B bits to obtain HE-SIG-B bits;
wherein the coded HE-SIG-B bits belong to a 20 MHz HE-SIG-B unit of the HE-SIG-B field,
wherein at least two complex values in the first set of N phase rotation values scrambling sequence are different resulting in different phase rotations, and each phase rotation value in the second set of N phase rotation values has the same value corresponding to the 20 MHz HE-SIG-B unit to each of the modulated symbols.

8. The wireless device of claim 7, wherein the HE-SIG-B bits belong to a 20 MHz HE-SIG-B unit of the HE-SIG-B field.

9. The wireless device of claim 7, wherein the HE PPDU further comprises i) a non-high throughput (HT) short training field (L-STF), a non-HT long training field (L-LTF), a non-HT signal (L-SIG) field, a repeated L-SIG field, and the HE signal A (HE-SIG-A) field which are followed by the HE-SIG-B field, and ii) the HE-STF, an HE-LTF, and an HE-data field which follow the HE-SIG-B field.

10. The wireless device of claim 7, wherein decoding the coded HE-SIG- B bits comprises:
de-puncturing the coded HE-SIG-B bits to generate the de-punctured HE-SIG-B bits, and
binary convolutional code (BCC) decoding the de-punctured HE-SIG-B bits to generate the HE-SIG-B bits.

11. A method for a wireless device to transmit a frame, the method comprising:
generating a high-efficiency (HE) physical layer protocol data unit (PPDU) including an HE signal B (HE-SIG-B) field that immediately follows an HE signal A (HE-SIG-A) field and immediately precedes an HE short training field (HE-STF), wherein the generating comprises:
generating coded HE-SIG-B bits, interleaving the coded HE-SIG-B bits to generate interleaved HE-SIG-B bits, modulating the interleaved HE-SIG-B bits to generate N modulated symbols, N being a positive integer, generating N phase-rotated symbols by applying both a first set of N phase rotation valuespattern and a second phase rotation pattern to the N modulated symbols respectively, and by applying a second set of N phase rotation values to the N modulated symbols respectively, wherein the second set of N phase rotation values is different from the first set of N phase rotation values, and
transforming the N phase-rotated symbols to an orthogonal frequency-division multiplexing (OFDM) symbol of the HE-SIG-B field; and
transmitting the HE PPDU;
wherein the coded HE-SIG-B bits belong to a 20 MHz HE-SIG-B unit of the HE-SIG-B field,
wherein at least two complex values in the first set of N phase rotation values scrambling sequence are different resulting in different phase rotations, and each phase rotation value in the second set of N phase rotation values has the same value corresponding to the 20 MHz HE-SIG-B unit to each of the modulated symbols.

* * * * *